(12) United States Patent
Katoh et al.

(10) Patent No.: US 7,525,572 B2
(45) Date of Patent: Apr. 28, 2009

(54) VIDEO CAMERA WITH ANTI-SHAKE SYSTEM

(75) Inventors: Hidehiro Katoh, Tokyo (JP); Yutaka Ichinoi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 855 days.

(21) Appl. No.: 10/805,285

(22) Filed: Mar. 22, 2004

(65) Prior Publication Data
US 2004/0189814 A1    Sep. 30, 2004

(30) Foreign Application Priority Data
Mar. 28, 2003    (JP)    ............... 2003-090300

(51) Int. Cl.
*G03B 17/00*    (2006.01)
*H04N 5/228*    (2006.01)

(52) U.S. Cl. ............... 348/208.2; 348/208.6; 396/53

(58) Field of Classification Search ............ 348/208.99, 348/208.2, 208.5, 208.6; 396/52, 53, 54, 396/55
See application file for complete search history.

(56) References Cited

U.S. PATENT DOCUMENTS

| | | | | |
|---|---|---|---|---|
| 5,422,643 A * | 6/1995 | Chu et al. | .................... | 341/141 |
| 6,573,930 B2 * | 6/2003 | Kyuma et al. | ............ | 348/208.5 |
| 6,940,542 B2 * | 9/2005 | Kitazawa et al. | ....... | 348/208.99 |
| 6,943,548 B1 * | 9/2005 | Hertz | ......................... | 324/309 |
| 2003/0102994 A1 * | 6/2003 | Stimmann | .................... | 341/139 |

FOREIGN PATENT DOCUMENTS

JP    07-288734    10/1995

* cited by examiner

*Primary Examiner*—Sinh N Tran
*Assistant Examiner*—Daniel M Pasiewicz
(74) *Attorney, Agent, or Firm*—Louis Woo

(57) ABSTRACT

A shake sensor outputs an analog shake detection signal representative of a shake of a camera body. An amplifier operates for amplifying the analog shake detection signal to generate an analog amplification-resultant signal. The analog shake detection signal and the analog amplification-resultant signal are converted into a digital shake detection signal and a first digital amplification-resultant signal, respectively. A signal value represented by the digital shake detection signal is amplified on a digital basis to generate a second digital amplification-resultant signal. A decision is made as to whether or not the signal value represented by the first digital amplification-resultant signal remains greater than a predetermined reference value during at least a prescribed time interval. One is selected from the first and second digital amplification-resultant signals in response to the result of the decision. A shake corrective signal is generated in response to the selected signal.

5 Claims, 13 Drawing Sheets

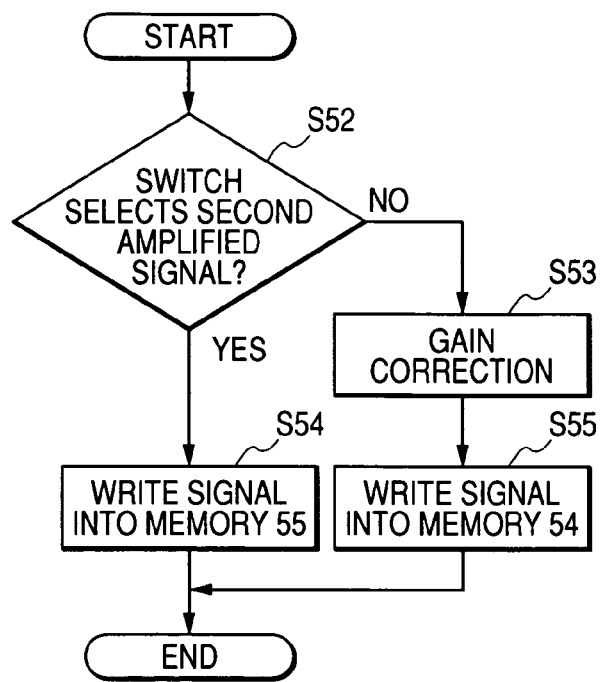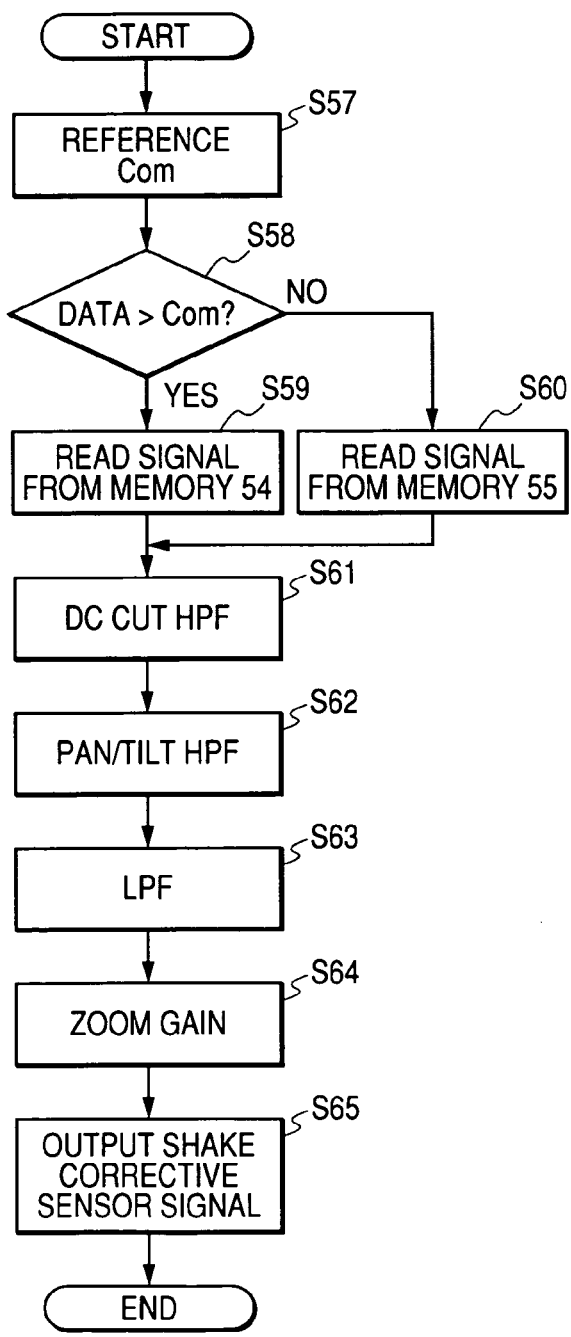

VIDEO CAMERA WITH ANTI-SHAKE SYSTEM

BACKGROUND OF THE INVENTION

1. Field of the Invention

This invention relates to a video camera equipped with an anti-shake system, that is, a system for correcting a camera-body shake usually caused by user's hand. In addition, this invention relates to a method of processing an information signal such as a shake detection signal.

2. Description of the Related Art

A first prior-art anti-shake system for a video camera includes a shake sensor and a controller. The shake sensor detects a shake of the body of the camera which is caused by user's hand. The shake sensor outputs a signal representative of the detected camera shake. An electric circuit in the camera generates a video signal from an electric signal outputted by an image sensor. The controller processes the video signal in response to the output signal of the shake sensor to compensate for the camera shake.

A second prior-art anti-shake system for a video camera includes an active prism, angular velocity sensors, and a controller. The active prism is provided in an optical system of the camera. The active prism functions to move the optical axis of the optical system relative to a CCD image sensor of the camera. The angular velocity sensors detect the angular velocities of the body of the camera in the vertical direction and the horizontal direction, respectively. The angular velocity sensors output signals representative of the detected angular velocities to the controller. The controller drives the active prism in response to the output signals of the angular velocity sensors, thereby compensating for a shake of the camera body which is caused by user's hand. As a result of the compensation, the position of the image of a subject on the CCD image sensor remains substantially fixed independent of the camera-body shake.

Japanese patent application publication number 7-288734/1995 discloses a camera apparatus equipped with an anti-shake system. The camera apparatus in Japanese application 7-288734/1995 includes angular velocity sensors which detect the angular velocities of the body of the camera apparatus in the pitching direction and the yawing direction respectively. The angular velocity sensors generate sensor signals representing the detected angular velocities. The sensor signals are fed to an A/D converter via filters and amplifiers. The A/D converter changes the sensor signals into first digital data and second digital data representing the detected angular velocities. Low pass filters extract drift components from the first and second digital data. The extracted drift components are fed to a pan tilt discrimination circuit as signals indicative of the center values (the 0 levels) related to the first and second digital data. The pan tilt discrimination circuit sets threshold values for the first and second digital data while using the 0 levels as references. The pan tilt discrimination circuit compares the levels represented by the first and second digital data with the threshold values. The pan tilt discrimination circuit decides whether panning the body of the camera apparatus or a shake thereof caused by user's hand is occurring, and whether tilting the body of the camera apparatus or a shake thereof caused by user's hand is occurring on the basis of the results of the comparison. High pass filters remove direct-current components from the first and second digital data, respectively. The high pass filters have cut-off frequencies. The pan tilt discrimination circuit varies the cut-off frequencies of the high pass filters in response to the result of the decision about whether panning the body of the camera apparatus or a shake thereof caused by user's hand is occurring, and in response to the result of the decision about whether tilting the body of the camera apparatus or a shake thereof caused by user's hand is occurring. The output signals from the high pass filters are integrated by integration circuits. A comparator circuit receives the integration-resultant signals as indications of the detected angular velocities in the pitching and yawing directions.

The camera apparatus in Japanese application 7-288734/1995 further includes an active prism. Pitching-direction motion of the active prism is detected by a first braking coil and a first photosensor. Signals representative of the detected pitching-direction motion are fed to the comparator circuit. Yawing-direction motion of the active prism is detected by a second braking coil and a second photosensor. Signals representative of the detected yawing-direction motion are fed to the comparator circuit. The comparator circuit compares the integration-resultant signals, the signals representative of the detected pitching-direction motion, and the signals representative of the detected yawing-direction motion. The comparator circuit controls a pitching-direction drive system and a yawing-direction drive system for the active prism in response to the results of the comparison. Thereby, it is possible to accurately compensate for a hand-caused shake of the body of the camera apparatus. In addition, it is possible to discriminate panning the body of the camera apparatus, tilting the camera-apparatus body, and a hand-caused shake of the camera-apparatus body from each other.

In the case of an anti-shake system including angular velocity sensors and an A/D converter for changing the output signals of the angular velocity sensors into corresponding digital signals, the dynamic range and accuracy of the system are basically decided by the A/D converter for the reasons as follows. The A/D converter periodically samples the sensor signals to generate analog signal samples. The A/D converter quantizes the analog signal samples in response to a quantization step size to generate digital signal samples each having a predetermined number of bits. The inevitable quantization error decreases and hence the accuracy of the digital signal samples rises as the quantization step size decreases. The dynamic range of the A/D converter widens as the bit number per digital signal sample increases. A decrease in the quantization step size and an increase in the bit number per digital signal sample cause an increase in the circuit scale of the A/D converter. In addition, an increase in the bit number causes a reduction in the rate of the processing of the digital signal samples.

SUMMARY OF THE INVENTION

It is an object of this invention to provide a video camera equipped with an anti-shake system having a wide dynamic range and a relatively small circuit scale.

It is a second object of this invention to provide an improved method of processing an information signal such as a shake detection signal.

A first aspect of this invention provides a video camera comprising an image sensor for converting incident light into an electric signal; first means for converting the electric signal generated by the image sensor into a digital video signal; a memory having a first storage area for storing segments of the digital video signal generated by the first means on a frame-by-frame basis; second means for detecting a shake of a camera body, and generating an analog detection signal representative of the detected shake; an amplifier for amplifying the analog detection signal generated by the second means to generate an analog amplification-resultant signal; third means for converting the analog detection signal generated by the second means and the analog amplification-resultant signal generated by the amplifier into a digital detection signal and a first digital amplification-resultant signal respectively; fourth means for amplifying a signal value represented by the digital detection signal generated by the third means on a digital basis to generate a second digital amplification-resultant signal; fifth means for deciding whether or not a signal value represented by the first digital amplification-resultant signal remains greater than a predetermined reference value during at least a prescribed time interval; sixth means for selecting the second digital amplification-resultant signal when the fifth means decides that the signal value represented by the first digital amplification-resultant signal remains greater than the predetermined reference value during at least the prescribed time interval, and selecting the first digital amplification-resultant signal when the fifth means decides that the signal value represented by the first digital amplification-resultant signal does not remain greater than the predetermined reference value during at least the prescribed time interval; seventh means for generating a shake corrective signal in response to the signal selected by the sixth means; eighth means for reading out segments of the digital video signal from a second storage area movable within the first storage area of the memory to generate a correction-resultant video signal; and ninth means for moving the second storage area relative to the first storage area in response to the shake corrective signal generated by the seventh means.

A second aspect of this invention provides a method of processing an information signal which comprises the steps of subjecting a first analog signal to linear operation with first and second gains to generate second and third analog signals respectively, the second gain being higher than the first gain; feeding the second analog signal and the third analog signal into an A/D converter on a time sharing basis to convert the second analog signal and the third analog signal into a first digital signal and a second digital signal respectively; deciding whether or not the A/D converter is saturated by the third analog signal; transmitting the first digital signal and discarding the second digital signal when it is decided that the A/D converter is saturated; and transmitting the second digital signal and discarding the first digital signal when it is decided that the A/D converter is not saturated.

A third aspect of this invention provides a method of processing an information signal which comprises the steps of converting a portion of an analog signal which has an amplitude less than a predetermined reference value into a first digital signal; converting a portion of the analog signal which has an amplitude equal to or greater than the predetermined reference value into a second digital signal; and multiplexing the first and second digital signals on a time sharing basis.

A fourth aspect of this invention provides a video camera comprising first means for detecting a shake of a camera body, and generating a first analog signal representative of the detected shake; second means for subjecting the first analog signal generated by the first means to linear operation with first and second gains to generate second and third analog signals respectively, the second gain being higher than the first gain; an A/D converter; third means for feeding the second analog signal and the third analog signal to the A/D converter on a time sharing basis to convert the second analog signal and the third analog signal into a first digital signal and a second digital signal respectively; fourth means for deciding whether or not the A/D converter is saturated by the third analog signal; fifth means for selecting the first digital signal and discarding the second digital signal when the fourth means decides that the A/D converter is saturated, and selecting the second digital signal and discarding the first digital signal when the fourth means decides that the A/D converter is not saturated; and sixth means for generating a shake corrective signal in response to the signal selected by the fifth means.

A fifth aspect of this invention is based on the fourth aspect thereof, and provides a video camera wherein the second means comprises an amplifier for amplifying the first analog signal into the third analog signal, and means for directly using the first analog signal as the second analog signal.

A sixth aspect of this invention is based on the fourth aspect thereof, and provides a video camera wherein the second means includes an amplitude modulator for subjecting the first analog signal to amplitude modulation to generate the second and third analog signals.

A seventh aspect of this invention is based on the fourth aspect thereof, and provides a video camera wherein the second means comprises an attenuator for attenuating the first analog signal into the second analog signal, and means for directly using the first analog signal as the third analog signal.

An eighth aspect of this invention provides a video camera comprising first means for detecting a shake of a camera body, and generating an analog signal representative of the detected shake; second means for converting a portion of the analog signal which has an amplitude less than a predetermined reference value into a first digital signal; third means for converting a portion of the analog signal which has an amplitude equal to or greater than the predetermined reference value into a second digital signal; and fourth means for generating a shake corrective signal in response to the first and second digital signals generated by the second and third means.

A ninth aspect of this invention is based on the eighth aspect thereof, and provides a video camera wherein the third means comprises a coring circuit for subjecting the analog signal to a coring process to generate a coring-resultant signal, and an A/D converter for converting the coring-resultant signal into the second digital signal.

A tenth aspect of this invention provides a video camera comprising first means for detecting a shake of a camera body, and generating an analog detection signal representative of the detected shake; second means for converting the analog detection signal generated by the first means into a digital detection signal having a variable resolution as viewed in an amplitude direction; third means for detecting an amplitude of the analog detection signal; fourth means for deciding whether or not the amplitude detected by the third means is smaller than a predetermined reference value; and fifth means for setting the resolution of the digital detection signal to a first value when the fourth means decides that the amplitude is smaller than the predetermined reference value, and setting the resolution of the digital detection signal to a second value smaller than the first value when the fourth means decides that the amplitude is not smaller than the predetermined reference value.

An eleventh aspect of this invention provides a video camera comprising an image sensor for converting incident light into an electric signal; first means for converting the electric signal generated by the image sensor into a digital video signal; a memory having a first storage area for storing segments of the digital video signal generated by the first means on a frame-by-frame basis; second means for detecting a shake of a camera body, and generating an analog detection signal representative of the detected shake; an attenuator for attenuating the analog detection signal generated by the second means to generate an analog attenuation-resultant signal; third means for converting the analog detection signal generated by the second means and the analog attenuation-resultant signal generated by the attenuator into a digital detection signal and a digital attenuation-resultant signal respectively; fourth means for amplifying a signal value represented by the digital attenuation-resultant signal generated by the third means on a digital basis to generate a digital amplification-resultant signal; fifth means for deciding whether or not a signal value represented by the digital detection signal remains greater than a predetermined reference value during at least a prescribed time interval; sixth means for selecting the digital amplification-resultant signal when the fifth means decides that the signal value represented by the digital detection signal remains greater than the predetermined reference value during at least the prescribed time interval, and selecting the digital detection signal when the fifth means decides that the signal value represented by the digital detection signal does not remain greater than the predetermined reference value during at least the prescribed time interval; seventh means for generating a shake corrective signal in response to the signal selected by the sixth means; eighth means for reading out segments of the digital video signal from a second storage area movable within the first storage area of the memory to generate a correction-resultant video signal; and ninth means for moving the second storage area relative to the first storage area in response to the shake corrective signal generated by the seventh means.

BRIEF DESCRIPTION OF THE DRAWINGS

FIG. 6 is a flowchart of a first segment of a control program for a microcomputer in FIG. 5.

FIG. 7 is a flowchart of a second segment of the control program for the microcomputer in FIG. 5.

DETAILED DESCRIPTION OF THE INVENTION

First Embodiment

Figure 1:
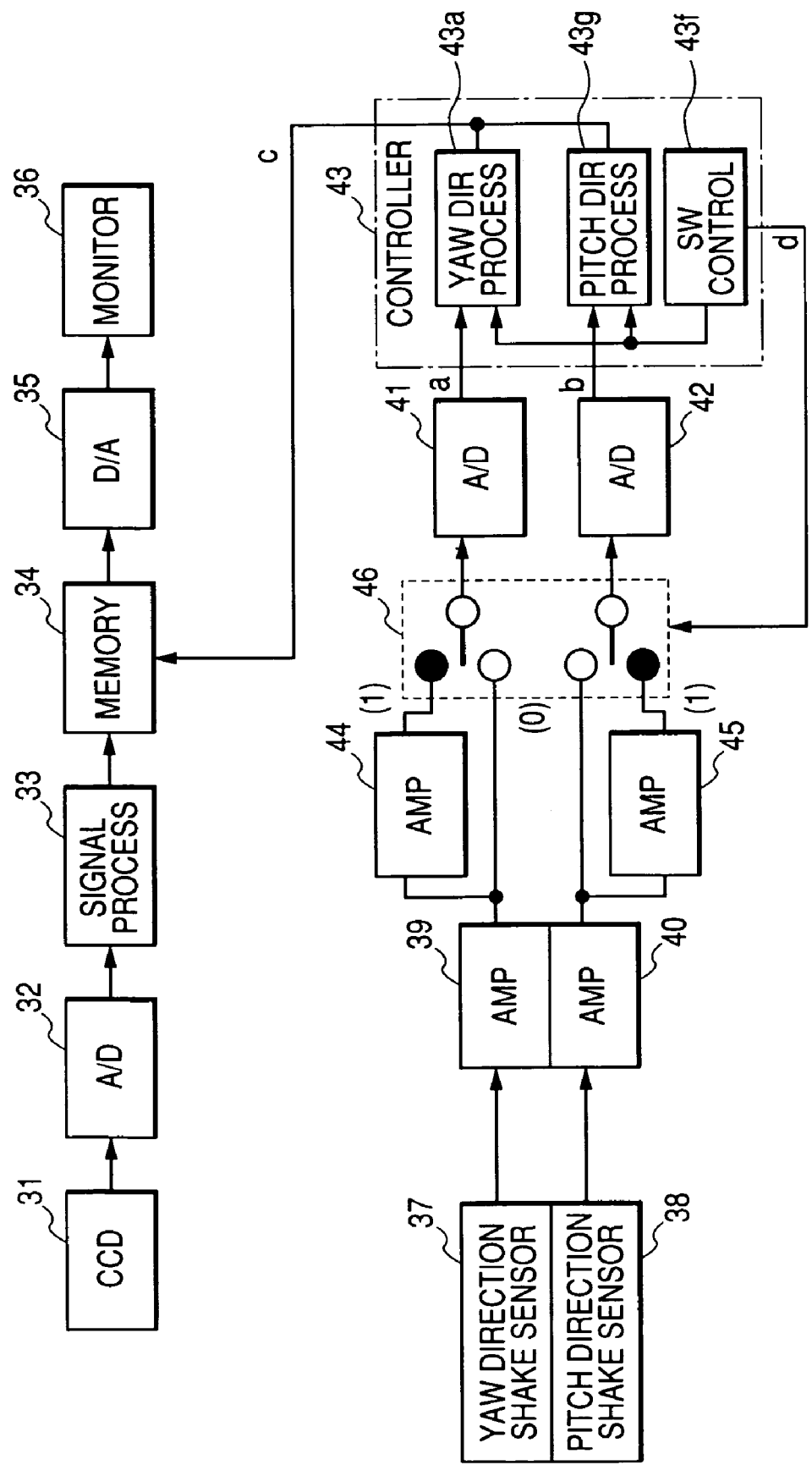
FIG. 1 is a block diagram of a video camera according to a first embodiment of this invention.

FIG. 1 shows a video camera according to a first embodiment of this invention. The video camera of FIG. 1 includes a CCD image sensor 31 to which light representative of an image of a subject to be taken is applied via a lens (not shown). The CCD image sensor 31 converts the light into an analog electric signal representative of the image which is referred to as an analog image signal. The CCD image sensor 31 outputs the analog image signal to an A/D (analog-to-digital) converter 32. The A/D converter 32 changes the analog image signal into a corresponding digital image signal. The A/D converter 32 outputs the digital image signal to a signal processing circuit 33. The signal processing circuit 33 processes the digital image signal into a digital video signal in a conventional way. The signal processing circuit 33 outputs the digital video signal to a memory 34. The digital video signal outputted from the signal processing circuit 33 represents a periodically-updated large-size frame.

The digital video signal is written into the memory 34 before being read out therefrom. Specifically, segments of the digital video signal which represent pixels composing every frame are sequentially written into different storage locations in the memory 34, respectively. The different storage locations constitute a first storage area in the memory 34. The digital video signal stored in the memory 34 is updated frame by frame. For every frame, ones are selected among the storage locations in the memory 34 in response to a read address signal "c", and segments of the digital video signal are sequentially read out from selected ones among the storage locations. The selected storage locations constitute a second storage area within the first storage area. The second storage area is moved relative to the first storage area in response to the read address signal "c". Thus, an accessed storage area within the memory 34, that is, a storage area within the memory 34 from which signal segments are read out, is moved relative to the memory 34 in response to the read address signal "c". The selection of ones among the storage locations is designed so that a portion being a normal-size frame can be cut from the large-size frame represented by all segments of the digital video signal stored in the memory 34. The cut portion, that is, the normal-size frame, is moved relative to the large-size frame in response to the read address signal "c".

The read-out digital video signal is transmitted from the memory 35 to a D/A (digital-to-analog) converter 35. The D/A converter 35 changes the digital video signal into a corresponding analog video signal. The D/A converter 35 outputs the analog video signal to a monitor or a display 36. The monitor 36 provides visual presentation of every 1-frame-corresponding image represented by the analog video signal.

The video camera of FIG. 1 further includes sensors 37 and 38. The sensor 37 detects a shake of the body of the camera in a yaw direction, and generates and outputs an analog sensor signal representative of the detected yaw-direction shake. The sensor 37 is referred to as the yaw-direction shake sensor 37. The sensor 38 detects a shake of the body of the camera in a pitch direction, and generates and outputs an analog sensor signal representative of the detected pitch-direction shake. The sensor 38 is referred to as the pitch-direction shake sensor 38.

The yaw-direction shake sensor 37 and the pitch-direction shake sensor 38 include, for example, angular velocity sensors.

The yaw-direction shake sensor 37 feeds the yaw-direction sensor signal to an amplifier 39. The amplifier 39 subjects the yaw-direction sensor signal to linear operation with a fixed gain. Specifically, the amplifier 39 enlarges the yaw-direction sensor signal. The amplifier 39 outputs the enlargement-resultant yaw-direction sensor signal to an amplifier 44 and a switch 46. The output signal from the amplifier 39 is referred as the first amplified yaw-direction sensor signal. The amplifier 44 subjects the first amplified yaw-direction sensor signal to linear operation with a fixed gain. Specifically, the amplifier 44 enlarges the first amplified yaw-direction sensor signal at a predetermined gain to generate a second amplified yaw-direction sensor signal. The amplifier 44 outputs the second amplified yaw-direction sensor signal to the switch 46.

The pitch-direction shake sensor 38 feeds the pitch-direction sensor signal to an amplifier 40. The amplifier 40 subjects the pitch-direction sensor signal to linear operation with a fixed gain. Specifically, the amplifier 40 enlarges the pitch-direction sensor signal. The amplifier 40 outputs the enlargement-resultant pitch-direction sensor signal to an amplifier 45 and the switch 46. The output signal from the amplifier 40 is referred as the first amplified pitch-direction sensor signal. The amplifier 45 subjects the first amplified pitch-direction sensor signal to linear operation with a fixed gain. Specifically, the amplifier 45 enlarges the first amplified pitch-direction sensor signal at the predetermined gain to generate a second amplified pitch-direction sensor signal. The amplifier 45 outputs the second amplified pitch-direction sensor signal to the switch 46.

The switch 46 has a first portion receiving the first and second amplified yaw-direction sensor signals from the amplifiers 39 and 44. The first portion of the switch 46 selects one among the first and second amplified yaw-direction sensor signals in response to a control signal "d", and passes the selected yaw-direction sensor signal to an A/D converter 41. Specifically, the first portion of the switch 46 selects the first amplified yaw-direction sensor signal when the control signal "d" is in a logic state of "0", and selects the second amplified yaw-direction sensor signal when the control signal "d" is in a logic state of "1". The control signal "d" is a clock pulse signal periodically changing between a logic state of "0" and a logic state of "1" at a first predetermined frequency. Therefore, the first portion of the switch 46 multiplexes the first and second amplified yaw-direction sensor signals on a time sharing basis. The first portion of the switch 46 outputs the multiplexing-resultant yaw-direction sensor signal to the A/D converter 41.

The switch 46 also has a second portion receiving the first and second amplified pitch-direction sensor signals from the amplifiers 40 and 45. The second portion of the switch 46 selects one among the first and second amplified pitch-direction sensor signals in response to the control signal "d", and passes the selected pitch-direction sensor signal to an A/D converter 42. Specifically, the second portion of the switch 46 selects the first amplified pitch-direction sensor signal when the control signal "d" is in a logic state of "0", and selects the second amplified pitch-direction sensor signal when the control signal "d" is in a logic state of "1". The second portion of the switch 46 multiplexes the first and second amplified pitch-direction sensor signals on a time sharing basis. The second portion of the switch 46 outputs the multiplexing-resultant pitch-direction sensor signal to the A/D converter 42.

The A/D converter 41 changes the multiplexing-resultant yaw-direction sensor signal into a corresponding digital yaw-direction sensor signal "a" through analog-to-digital conversion including quantization. The digital yaw-direction sensor signal "a" has a sequence of time segments, that is, digital signal samples each having a predetermined number of bits. In other words, the A/D converter 41 changes the multiplexing-resultant yaw-direction sensor signal into a sequence of digital signal samples constituting a digital yaw-direction sensor signal "a". The A/D converter 41 outputs the digital yaw-direction sensor signal "a" to a controller 43.

The A/D converter 42 changes the multiplexing-resultant pitch-direction sensor signal into a corresponding digital pitch-direction sensor signal "b" through analog-to-digital conversion including quantization. The digital pitch-direction sensor signal "b" has a sequence of time segments, that is, digital signal samples each having a predetermined number of bits. In other words, the A/D converter 42 changes the multiplexing-resultant pitch-direction sensor signal into a sequence of digital signal samples constituting a digital pitch-direction sensor signal "b". The A/D converter 42 outputs the digital pitch-direction sensor signal "b" to the controller 43.

The controller 43 includes a yaw-direction processing section 43a, a pitch-direction processing section 43g, and a switch control section 43f. The controller 43 may be formed by a microcomputer, a digital signal processor, or a similar device. The switch control section 43f generates the control signal "d". The switch control section 43f feeds the control signal "d" to the switch 46. The switch control section 43f also generates another control signal S1. The switch control section 43f feeds the control signal S1 to the yaw-direction processing section 43a and the pitch-direction processing section 43g. The yaw-direction processing section 43a processes the digital yaw-direction sensor signal "a" in response to the control signal S1 to generate a yaw-direction shake corrective signal. The pitch-direction processing section 43g processes the digital pitch-direction sensor signal "b" in response to the control signal S1 to generate a pitch-direction shake corrective signal. The yaw-direction shake corrective signal and the pitch-direction shake corrective signal are combined into a composite shake corrective signal which is the read address signal "c". The controller 43 feeds the composite shake corrective signal (the read address signal) "c" to the memory 34.

For every frame, ones are selected among the storage locations in the memory 34 in response to the composite shake corrective signal (the read address signal) "c", and segments of the digital video signal are sequentially read out from selected ones among the storage locations. Thus, an accessed storage area within the memory 34, that is, a storage area within the memory 34 from which signal segments are read out, is moved relative to the memory 34 in response to the composite shake corrective signal "c". The selection of ones among the storage locations is designed so that a portion being a normal-size frame can be cut from the large-size frame represented by all segments of the digital video signal stored in the memory 34. The cut portion, that is, the normal-size frame, is moved relative to the large-size frame in response to the composite shake corrective signal "c". The movement of the cut portion (the normal-size frame) in response to the composite shake corrective signal is designed to compensate for both the yaw-direction shake and the pitch-direction shake. As a result of the compensation, the position of the image of a subject on the monitor 36 is substantially independent of the yaw-direction shake and the pitch-direction shake.

The yaw-direction sensor signal and the pitch-direction sensor signal outputted from the sensors 37 and 38 are processed in similar ways. Therefore, only the processing of the yaw-direction sensor signal will be described below in more detail.

Figure 2:
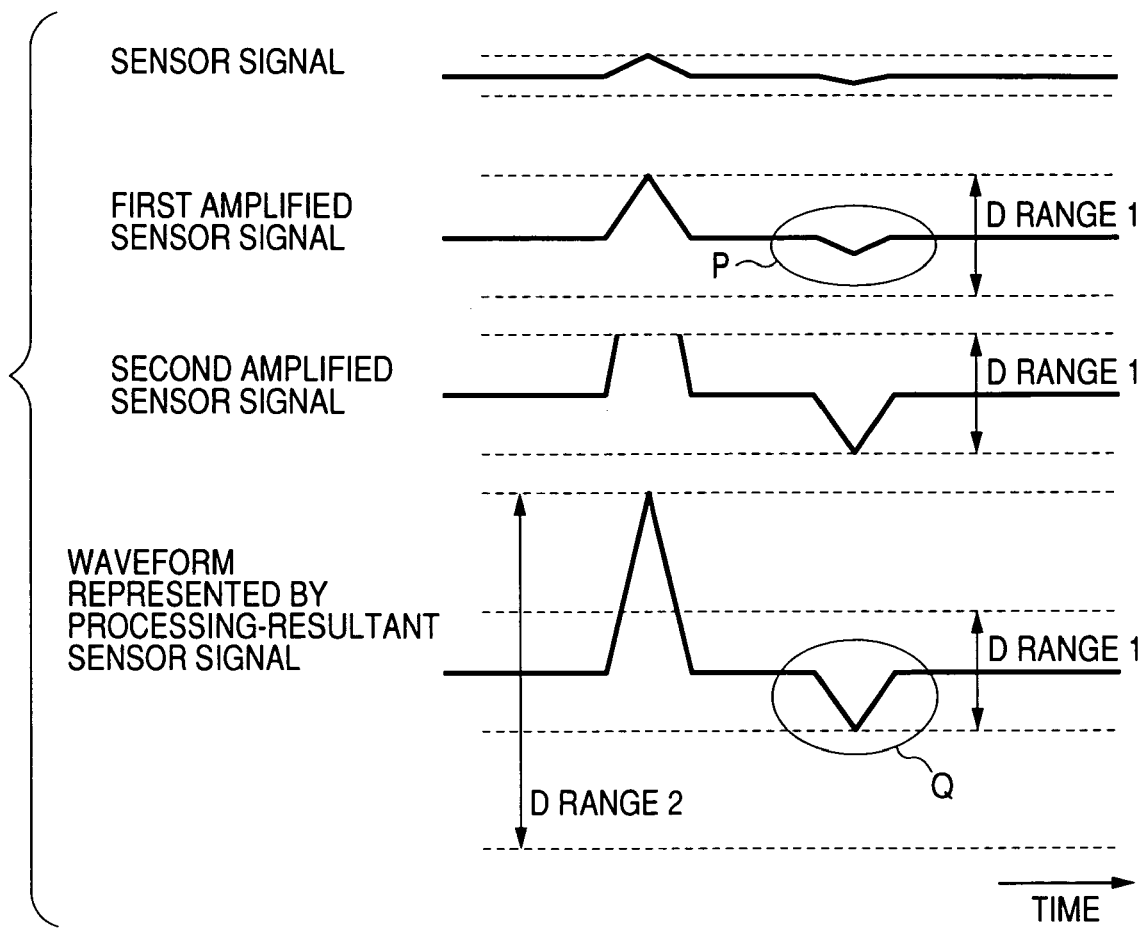
FIG. 2 is a time-domain diagram of various signals in the video camera of FIG. 1.

When the sensor signal (the yaw-direction sensor signal) outputted from the yaw-direction sensor 37 has a waveform shown in FIG. 2, the first and second amplified sensor signals outputted from the amplifiers 39 and 44 have waveforms shown in FIG. 2. The switch 46 multiplexes the first and second amplified sensor signals, and outputs the multiplexing-resultant sensor signal to the A/D converter 41. The A/D converter 41 changes the multiplexing-resultant sensor signal into a corresponding digital sensor signal "a" being a sequence of digital signal samples each having the predetermined number of bits. Thus, the number of bits composing every signal sample in the digital sensor signal "a" is fixed regardless of whether the multiplexing-resultant sensor signal currently originates from the first amplified sensor signal or the second amplified sensor signal. Accordingly, the first and second amplified sensor signals are transmitted via the A/D converter 41 to the controller 43 at a same dynamic range (D range) "1". The controller 43 amplifies the signal level represented by every signal sample in the digital sensor signal "a" which originates from the first amplified sensor signal on a digital basis. The gain of the amplification by the controller 43 is equal to the gain of the amplifier 44. The amplification may be equivalent to a bit extension (an effective-bit-number increase) or a bit shift for signal samples in the digital sensor signal "a" which originates from the first amplified sensor signal. The controller 43 combines ones of amplification-resultant signal samples in the digital sensor signal "a" which originate from the first amplified sensor signal and ones of signal samples in the digital sensor signal "a" which originate from the second amplified sensor signal. Thereby, the controller 43 generates a second digital sensor signal or a processing-resultant digital sensor signal which represents a waveform shown in FIG. 2, and which relates to a dynamic range (D range) "2" wider than the dynamic range (D range) "1". A small-amplitude portion P of the first amplified sensor signal is converted into a larger-amplitude portion Q of the waveform represented by the processing-resultant digital sensor signal. In this way, the bit accuracy is increased.

The yaw-direction processing section 43a and the pitch-direction processing section 43g are similar. Therefore, only the yaw-direction processing section 43a will be described below in more detail.

Figure 3:
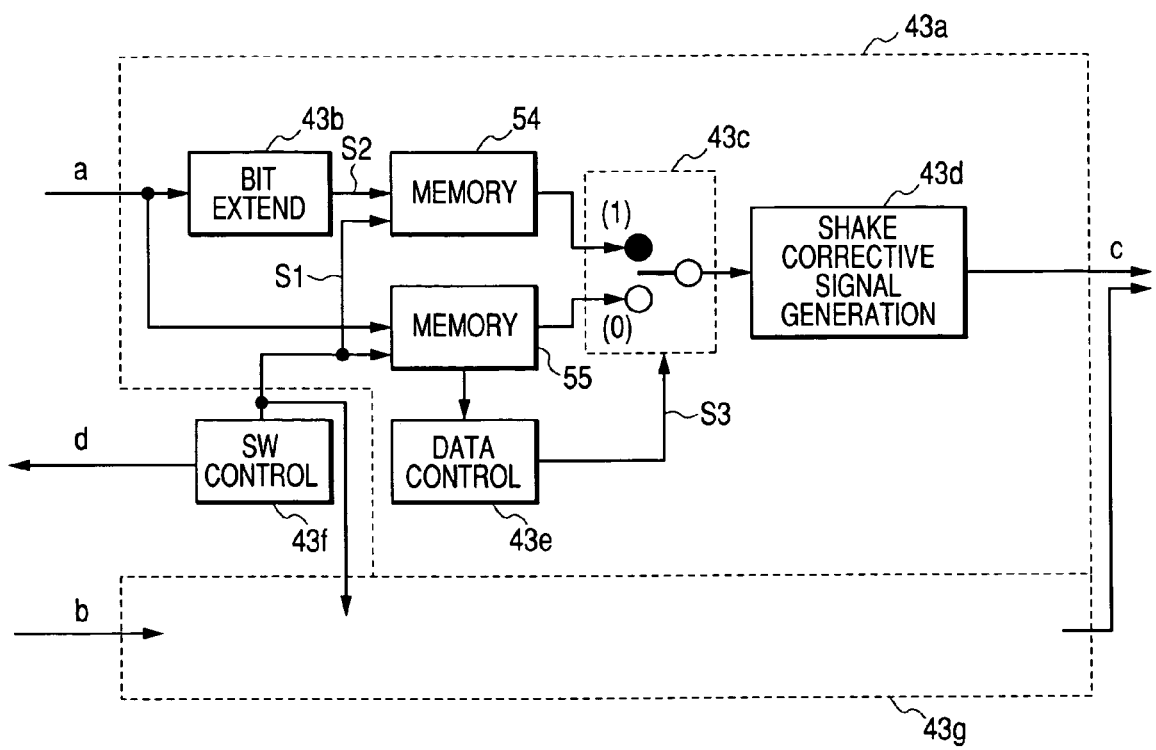
FIG. 3 is a block diagram of a portion of a controller in FIG. 1.

As shown in FIG. 3, the yaw-direction processing section 43a includes a bit extending section 43b, a switch section 43c, a shake corrective signal generating section 43d, a data control section 43e, and memories 54 and 55.

The digital sensor signal "a" is applied to the bit extending section 43b and the memory 55. The digital sensor signal "a" is also referred to as the non-amplified digital sensor signal "a". The bit extending section 43b amplifies the level represented by the digital sensor signal "a" on a digital basis. Specifically, the bit extending section 43b multiplies a predetermined constant (greater than 1) and the value represented by every signal sample in the digital sensor signal "a". The multiplication amplifies the level represented by every signal sample in the digital sensor signal "a" at a gain given by the constant. The constant is chosen to correspond to the gain of the amplifier 44. Thus, the bit extending section 43b digitally amplifies the digital sensor signal "a" into a second digital sensor signal (an amplification-resultant digital sensor signal) S2. The amplification by the bit extending section 43b may be equivalent to a bit extension (an effective-bit-number increase) or a bit shift for the digital sensor signal "a". The amplification-resultant digital sensor signal S2 is applied from the bit extending section 43b to the memory 54.

Figure 4:
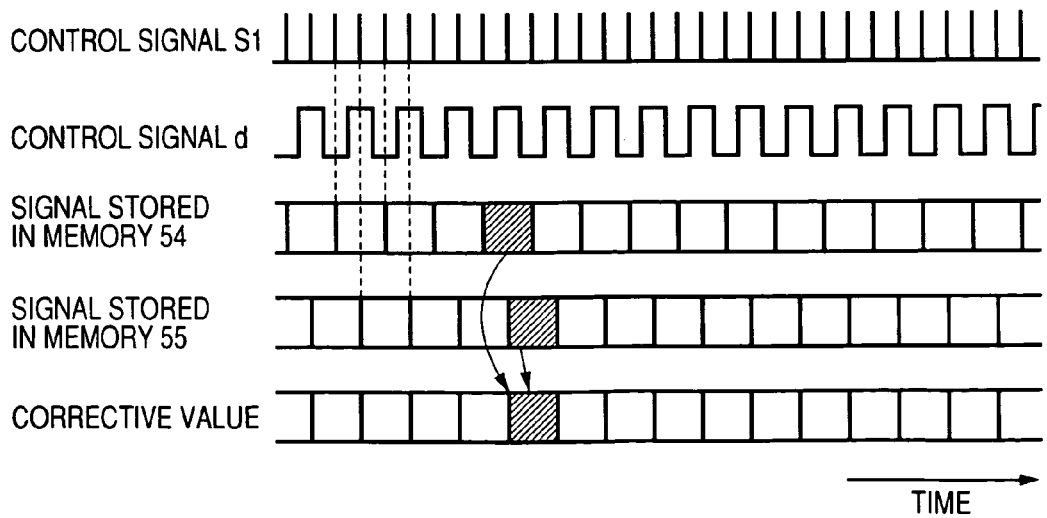
FIG. 4 is a time-domain diagram of various signals in the controller of FIG. 3.

The switch control section 43f generates the control signal S1. The control signal S1 is a pulse signal having a frequency twice the frequency of the control signal "d" for the switch 46. The control signal S1 has a predetermined phase relation with the control signal "d". The switch control section 43f applies the control signal S1 to the memories 54 and 55. As shown in FIG. 4, the control signal Si has a train of pulses temporally spaced at equal intervals. As shown in FIG. 4, the control signal "d" for the switch 46 has a rectangular waveform. The time positions of pulses in the control signal S1 substantially coincide with the temporal centers of positive-polarity and negative-polarity pulses in the control signal "d".

For example, the switch control section 43f includes a clock signal generator for producing a basic clock pulse signal, a waveform shaper for shaping the basic clock pulse signal into the control signal S1, and a counter or a flip-flop for halving the frequency of the basic clock pulse signal to generate the control signal "d".

With reference to FIG. 4, first alternate ones of pulses in the control signal S1 serve as data write pulses for the memory 54 while second alternate ones thereof serve as data write pulses for the memory 55. Each of the memories 54 and 55 includes a flip-flop or a bistable multivibrator for halving the frequency of the control signal S1 to generate data write pulses. The amplification-resultant digital sensor signal S2 alternately corresponds to the first amplified sensor signal and the second amplified sensor signal generated by the amplifiers 39 and 44. The amplification-resultant digital sensor signal S2 is written into the memory 54 in response to every related data write pulse while corresponding to the first amplifier sensor signal generated by the amplifier 39. Similarly, the non-amplified digital sensor signal "a" alternately corresponds to the first amplified sensor signal and the second amplified sensor signal generated by the amplifiers 39 and 44. The non-amplified digital sensor signal "a" is written into the memory 55 in response to every related data write pulse while corresponding to the second amplifier sensor signal generated by the amplifier 44.

The amplification-resultant digital sensor signal S2 is read out from the memory 54 immediately after being written thereinto. The read-out digital sensor signal S2 is fed to the switch section 43c. The non-amplified digital sensor signal "a" is read out from the memory 55 immediately after being written thereinto. The read-out digital sensor signal "a" is fed to the switch section 43c. The switch section 43c selects one from the read-out digital sensor signals S2 and "a" in response to a binary control signal S3, and passes the selected digital sensor signal to the shake corrective signal generating section 43d. Specifically, the switch section 43c selects the read-out digital sensor signal "a" when the control signal S3 is in a logic state of "0", and selects the read-out digital sensor signal S2 when the control signal S3 is in a logic state of "1".

The data control section 43e sets a reference value Com for the magnitude or amplitude of the yaw-direction shake. The default of the reference value Com corresponds to the maximum dynamic range of the A/D converter 41 or the amplifier 44. The reference value Com can be adjustable from the default. The reference value Com is positive. The data control section 43e accesses every signal sample stored in the memory 55. Alternatively, the data control section 43e may access every signal sample stored in the memory 54. The data control section 43e compares the value (the absolute value) represented by every accessed signal sample with the reference value Com. The data control section 43e decides whether or not the values (the absolute values) represented by at least two successive signal samples are greater than the reference value Com. The data control section 43e generates the control signal S3 in response to the result of the decision. The data control section 43e feeds the control signal S3 to the switch section 43c. The data control section 43e and the switch section 43c cooperate to implement the following procedure. In the case where the values (the absolute values) represented by at least two successive signal samples are greater than the reference value Com, the switch section 43c selects the amplified digital sensor signal S2 read out from the memory 54. Otherwise, the switch section 43c selects the non-amplified digital sensor signal "a" read out from the memory 55. The selected digital sensor signal is used by the shake corrective signal generating section 43d to generate a corresponding shake corrective value as shown in FIG. 4.

The shake corrective signal generating section 43d subjects the selected digital sensor signal (the output signal from the switch section 43c) to a succession of a high pass filtering process for removing direct-current signal components, a high pass filtering process for removing signal components caused by panning or tilting the body of the camera, a low pass filtering process for smoothing the level represented by the digital sensor signal, and a zoom-power correcting process. As a result, the shake corrective signal generating section 43d produces the yaw-direction shake corrective signal, that is, the yaw-direction component of the composite shake corrective signal "c".

Second Embodiment

Figure 5:
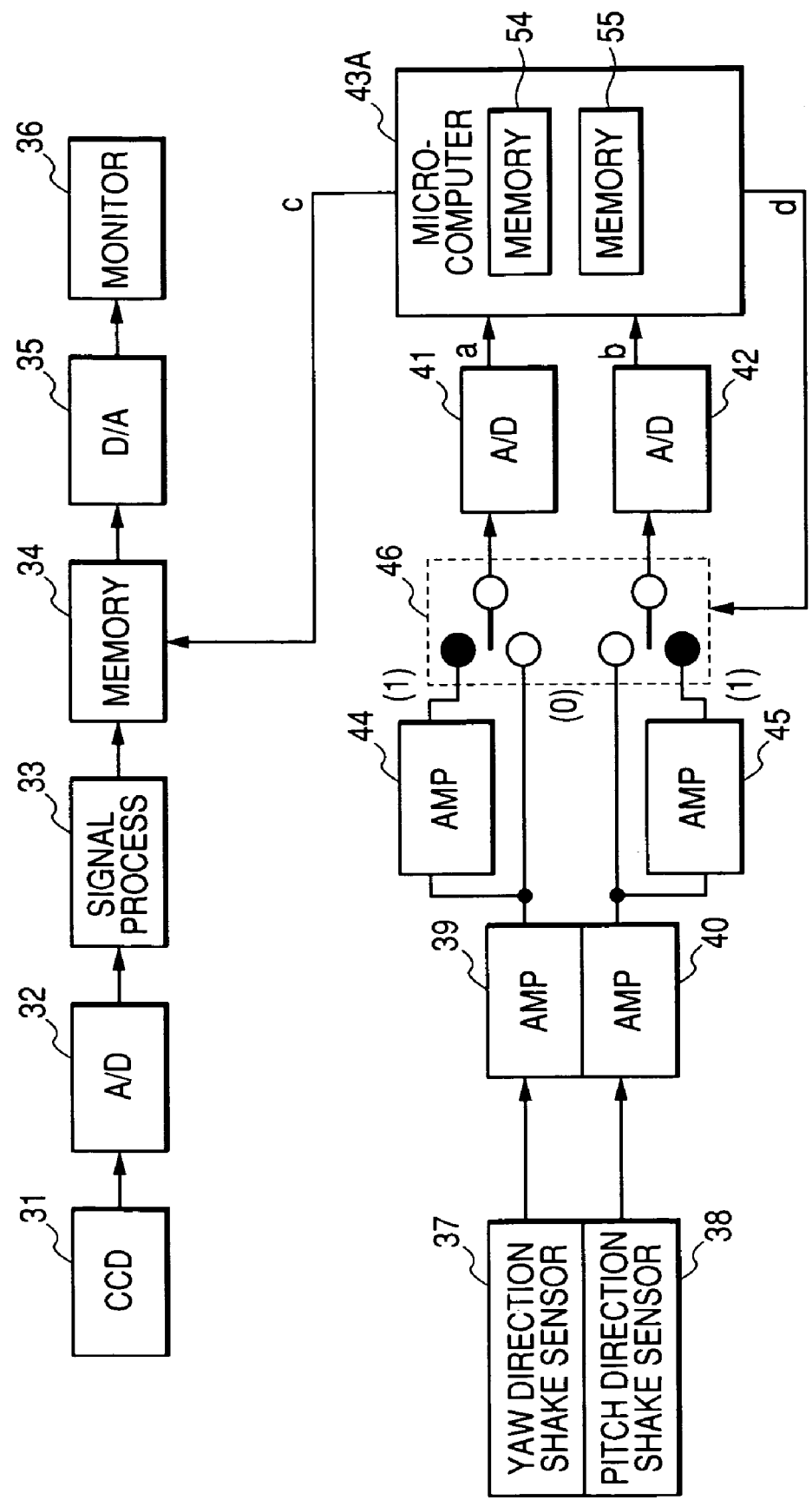
FIG. 5 is a block diagram of a video camera according to a second embodiment of this invention.

FIG. 5 shows a video camera according to a second embodiment of this invention. The video camera of FIG. 5 is similar to that of FIG. 1 except that a microcomputer 43A replaces the controller 43.

The microcomputer 43A includes a combination of an input/output port, a CPU, a ROM, a RAM, and a clock signal generator. The microcomputer 43A has the memories 54 and 55 provided in the RAM. The microcomputer 43A has a section inclusive of the clock signal generator for producing the control signal "d" for the switch 46. The microcomputer 43A operates in accordance with a control program stored in the ROM or the RAM. The microcomputer 43A processes the digital yaw-direction sensor signal "a" and the digital pitch-direction sensor signal "b" into the yaw-direction shake corrective signal and the pitch-direction shake corrective signal respectively. The processing of the digital yaw-direction sensor signal "a" and the processing of the digital pitch-direction sensor signal "b" are similar to each other. Therefore, only the processing of the digital yaw-direction sensor signal "a" will be described below in detail.

FIG. 6 is a flowchart of a first segment of the control program for the microcomputer 43A. The program segment in FIG. 6 is executed for every signal sample in the digital sensor signal "a". As shown in FIG. 6, a first step S52 of the program segment decides whether or not the switch 46 currently selects the second amplified sensor signal outputted from the amplifier 44 by referring to the logic state of the control signal "d". When the switch 46 currently selects the second amplified sensor signal, the program advances from the step S52 to a step S54. When the switch 46 does not currently select the second amplified sensor signal, that is, when the switch 46 currently selects the first amplified sensor signal outputted from the amplifier 39, the program advances from the step S52 to a step S53.

The step S54 writes the digital sensor signal (the non-amplified digital sensor signal) "a" into the memory 55. After the step S54, the current execution cycle of the program segment ends.

The step S53 makes a gain correction to the digital sensor signal "a". Specifically, the step S53 amplifies the level represented by the digital sensor signal "a" on a digital basis. In more detail, the step S53 multiplies a predetermined constant (greater than 1) and the value represented by the digital sensor signal "a". The multiplication amplifies the level represented by the digital sensor signal "a" at a gain given by the constant. The constant is chosen to correspond to the gain of the amplifier 44. Thus, the step S53 digitally amplifies the digital sensor signal "a" into a second digital sensor signal (an amplification-resultant digital sensor signal) S2. The amplification by the step S53 may be equivalent to a bit extension (an effective-bit-number increase) or a bit shift for the digital sensor signal "a".

A step S55 following the step S54 writes the amplification-resultant digital sensor signal S2 into the memory 54. After the step S55, the current execution cycle of the program segment ends.

FIG. 7 is a flowchart of a second segment of the control program for the microcomputer 43A. The program segment in FIG. 7 is executed for every signal sample in the memory 54 or 55. As shown in FIG. 7, a first step S57 of the program segment sets a reference value Com for the magnitude or amplitude of the yaw-direction shake. The default of the reference value Com corresponds to the maximum dynamic range of the A/D converter 41 or the amplifier 44. The reference value Com can be adjustable from the default.

A step S58 following the step S57 accesses the non-amplified digital sensor signal "a" currently stored in the memory 55. The step S58 compares the value represented by the accessed non-amplified digital sensor signal "a" with the reference value Com. The step S58 stores information representative of the result of the decision into the RAM within the microcomputer 43A for use by the next execution cycle of the program segment. The step S58 retrieves information representative of the result of the decision made in the immediately-preceding execution cycle of the program segment. The step S58 decides whether or not the values represented by the current non-amplified digital sensor signal and the immediately-preceding digital sensor signal are greater than the reference value Com. When the values represented by the current non-amplified digital sensor signal and the immediately-preceding digital sensor signal are greater than the reference value Com, the program advances from the step S58 to a step S59. Otherwise, the program advances from the step S58 to a step S60.

Alternatively, the step S58 may implement the following procedure. The step S58 accesses the digital sensor signal S2 currently stored in the memory 54. The step S58 compares the value represented by the accessed digital sensor signal S2 with the reference value Com. The step S58 stores information representative of the result of the decision into the RAM within the microcomputer 43A for use by the next execution cycle of the program segment. The step S58 retrieves information representative of the result of the decision made in the immediately-preceding execution cycle of the program segment. The step S58 decides whether or not the values represented by the current digital sensor signal and the immediately-preceding digital sensor signal are greater than the reference value Com. When the values represented by the current digital sensor signal and the immediately-preceding digital sensor signal are greater than the reference value Com, the program advances from the step S58 to the step S59. Otherwise, the program advances from the step S58 to the step S60.

The step S59 reads out the amplification-resultant digital sensor signal S2 from the memory 54. After the step S59, the program advances to a step S61.

The step S60 reads out the non-amplified digital sensor signal "a" from the memory 55. After the step S60, the program advances to the step S61.

The step S61 subjects the read-out digital sensor signal provided by the step S59 or S60 to a high pass filtering process for removing direct-current signal components to get a first processing-resultant signal.

A step S62 following the step S61 subjects the first processing-resultant signal to a high pass filtering process for removing signal components caused by panning or tilting the body of the camera to get a second processing-resultant signal.

A step S63 subsequent to the step S62 subjects the second processing-resultant signal to a low pass filtering process for smoothing the level represented by the digital sensor signal to get a third processing-resultant signal.

A step S64 following the step S63 subjects the third processing-resultant signal to a zoom-power correcting process to get a yaw-direction shake corrective signal, that is, the yaw-direction component of a composite shake corrective signal "c".

A step S65 subsequent to the step S64 outputs the yaw-direction shake corrective signal to the memory 34.

Third Embodiment

A third embodiment of this invention is similar to the first or second embodiment thereof except for design changes mentioned hereafter.

In the third embodiment of this invention, the gain of the amplifiers 44 and 45 is set to 2. The processing of the digital yaw-direction sensor signal "a" and the processing of the digital pitch-direction sensor signal "b" are similar to each other. Therefore, only the processing of the digital yaw-direction sensor signal "a" will be described below in detail.

Figure 8:
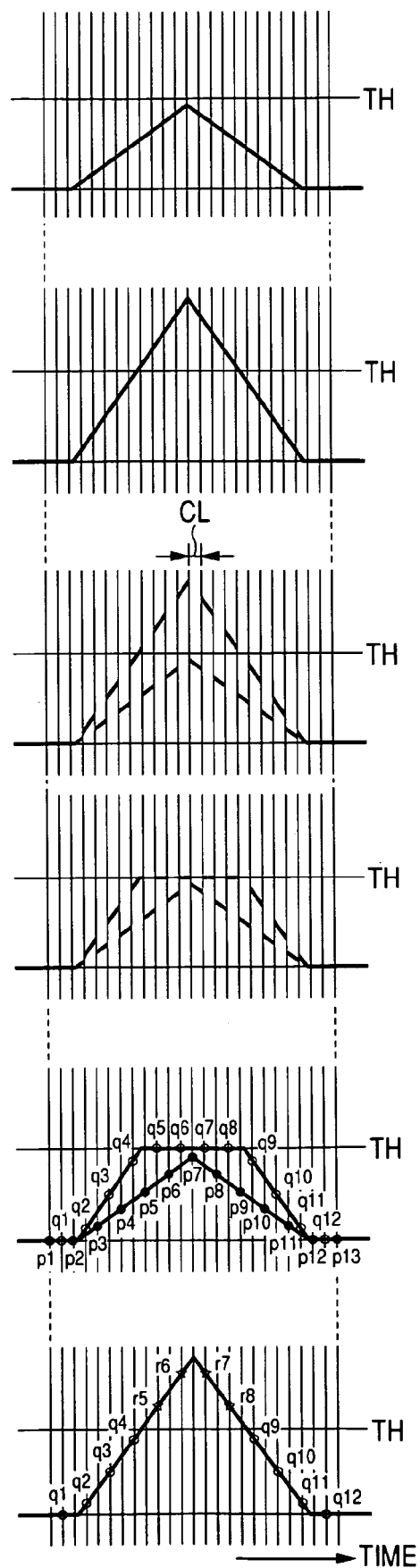
FIG. 8 is a time-domain diagram of various signals in a video camera according to a third embodiment of this invention.

When the first amplified sensor signal outputted from the amplifier 39 has a waveform shown in FIG. 8, the second amplified sensor signal outputted from the amplifier 44 has a waveform shown in FIG. 8. The level of the second amplified sensor signal is equal to twice the level of the first amplified sensor signal.

The switch 46 multiplexes the first and second amplified sensor signals on a time sharing basis. The multiplexing-resultant sensor signal has a waveform shown in FIG. 8. During first alternate ones of clock periods CL, the multiplexing-resultant sensor signal is formed by the first amplified sensor signal. During second alternate ones of clock periods CL, the multiplexing-resultant sensor signal is formed by the second amplified sensor signal.

The A/D converter 41 receives the multiplexing-resultant sensor signal from the switch 46. The A/D converter 41 has a certain limit TH of its dynamic range. Therefore, the A/D converter 41 regards the multiplexing-resultant signal as a signal having a waveform shown in FIG. 8 (the waveform seen from the A/D converter 41). When the level of the multiplexing-resultant sensor signal exceeds the dynamic-range limit TH, the A/D converter 41 is saturated so that the A/D converter 41 regards the level as being equal to the dynamic-range limit TH. An example of detailed operation of the A/D converter 41 is as follows. For every clock period, the A/D converter 41 samples the waveform seen from the A/D converter 41 to get an analog signal sample, and converts the analog signal sample into a corresponding digital signal sample. Thus, the A/D converter 41 generates and outputs a sequence of digital signal samples representing values p1, q1, p2, q2, . . . , p12, and q12 shown in FIG. 8. The line connecting the points of the values p1, p2, . . . , and p12 corresponds to the waveform of the first amplified sensor signal while the line connecting the points of the values q1, q2, . . . , and q12 corresponds to the waveform of the second amplified sensor signal. In FIG. 8, the sample values q5, q6, q7, and q8 are equal to the dynamic-range limit TH and are inaccurate since they are generated when the A/D converter 41 is saturated. The sequence of digital signal samples outputted from the A/D converter 41 is the digital yaw-direction sensor signal "a". The digital yaw-direction sensor signal "a" is fed to the controller 43 or the microcomputer 43A.

In the third embodiment of this invention, the controller 43 or the microcomputer 43A processes the digital yaw-direction sensor signal "a" to get a processing-resultant digital sensor signal representing a waveform shown in FIG. 8. Specifically, the controller 43 or the microcomputer 43A accesses alternate ones of signal samples in the digital yaw-direction sensor signal "a" which originate from the second amplified sensor signal. The controller 43 or the microcomputer 43A compares the value represented by every accessed digital signal sample with the dynamic-range limit TH to decide whether or not the A/D converter 41 is saturated. When the value represented by the accessed digital signal sample is smaller than the dynamic-range limit TH, that is, when the A/D converter 41 is not saturated, the controller 43 or the microcomputer 43A uses the accessed digital signal sample as a corresponding time segment (a corresponding sample) of the processing-resultant digital sensor signal. When the value represented by the accessed digital signal sample is equal to the dynamic-range limit TH, that is, when the A/D converter 41 is saturated, the controller 43 or the microcomputer 43A discards the accessed digital signal sample and generates a corresponding time segment (a corresponding sample) of the processing-resultant digital sensor signal from a signal sample in the digital yaw-direction sensor signal "a" which temporally neighbors the accessed digital signal sample, and which originates from the first amplified sensor signal. Specifically, the value represented by the neighboring signal sample is doubled, and the resultant signal sample is used as a corresponding time segment (a corresponding sample) of the processing-resultant digital sensor signal. Doubling the value is executed by performing a bit shift of the signal sample.

Figure 9:
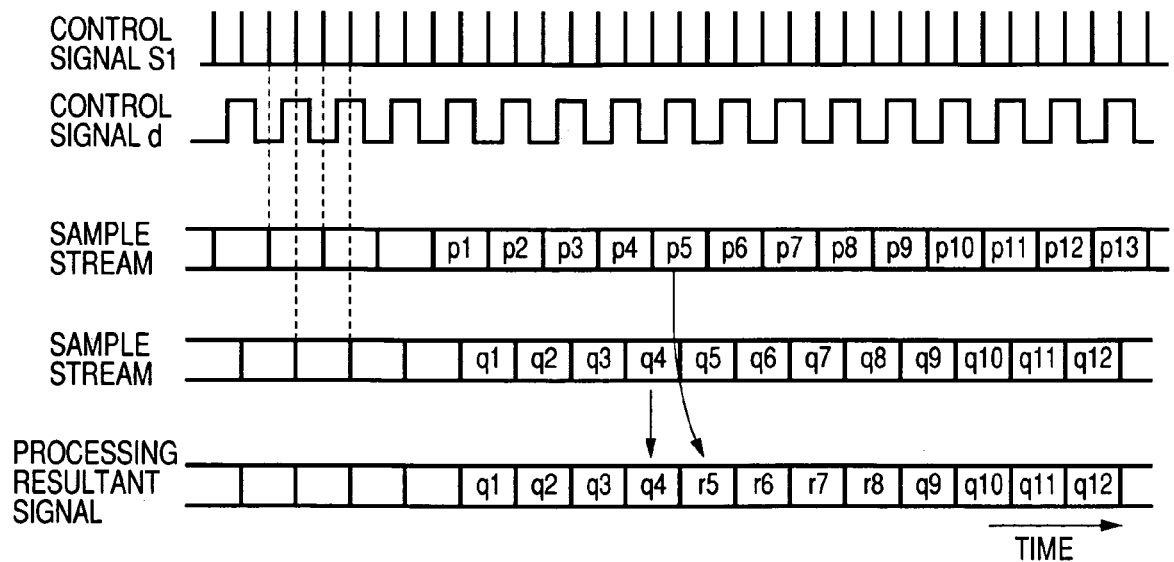
FIG. 9 is a time-domain diagram of various signals in the video camera of the third embodiment of this invention.

With reference to FIGS. 8 and 9, the digital signal sample representing the value q4 is directly used as a corresponding time segment (a corresponding sample) of the processing-resultant digital sensor signal. The digital signal sample representing the value q5 is discarded, and the value p5 (or the value p6) represented by a neighboring digital signal sample is doubled and the resultant digital signal sample representing the value r5 (=2·p5 or 2·p6) is used as a corresponding time segment (a corresponding sample) of the processing-resultant digital sensor signal.

Fourth Embodiment

A fourth embodiment of this invention is similar to the third embodiment thereof except for design changes mentioned hereafter.

In the fourth embodiment of this invention, the processing of the digital yaw-direction sensor signal "a" and the processing of the digital pitch-direction sensor signal "b" are similar to each other. Therefore, only the processing of the digital yaw-direction sensor signal "a" will be described below in detail.

The controller 43 or the microcomputer 43A accesses alternate ones of signal samples in the digital yaw-direction sensor signal "a" which originate from the second amplified sensor signal. The controller 43 or the microcomputer 43A compares the value represented by every accessed digital signal sample with the dynamic-range limit TH to decide whether or not the A/D converter 41 is saturated. When the value represented by the accessed digital signal sample is smaller than the dynamic-range limit TH, that is, when the A/D converter 41 is not saturated, the controller 43 or the microcomputer 43A uses the accessed digital signal sample as a corresponding time segment (a corresponding sample) of the processing-resultant digital sensor signal. When the value represented by the accessed digital signal sample is equal to the dynamic-range limit TH, that is, when the A/D converter 41 is saturated, the controller 43 or the microcomputer 43A discards the accessed digital signal sample and generates a corresponding time segment (a corresponding sample) of the processing-resultant digital sensor signal from two signal samples in the digital yaw-direction sensor signal "a" which temporally neighbor the accessed digital signal sample, and which originate from the first amplified sensor signal. Specifically, the two neighboring digital signal samples immediately precede and follow the accessed digital signal sample, respectively. The values represented by the two neighboring digital signal samples are added, and a new digital signal sample is assigned the addition result. Then, the new digital signal sample is used as a corresponding time segment (a corresponding sample) of the processing-resultant digital sensor signal.

Figure 10:
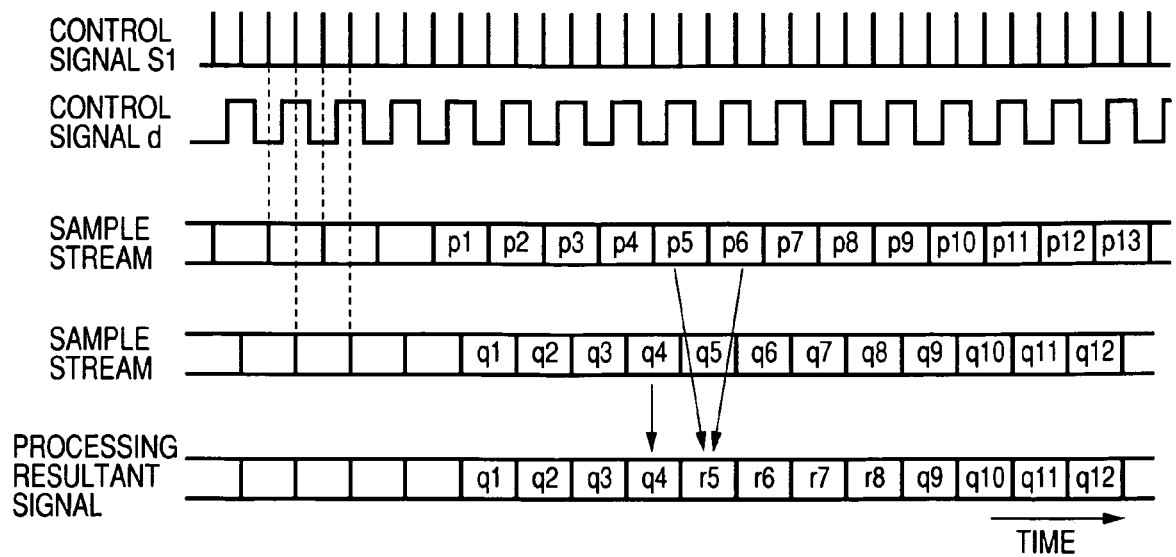
FIG. 10 is a time-domain diagram of various signals in a video camera according to a fourth embodiment of this invention.

With reference to FIG. 10, the digital signal sample representing the value q4 is directly used as a corresponding time segment (a corresponding sample) of the processing-resultant digital sensor signal. The digital signal sample representing the value q5 is discarded, and the values p5 and p6 represented by neighboring digital signal samples are added. Then, a new digital signal sample is assigned the addition result r5 (=p5+p6), and the new digital signal sample is used as a corresponding time segment (a corresponding sample) of the processing-resultant digital sensor signal.

Fifth Embodiment

A fifth embodiment of this invention is similar to the third embodiment thereof except for design changes mentioned hereafter.

Figure 11:
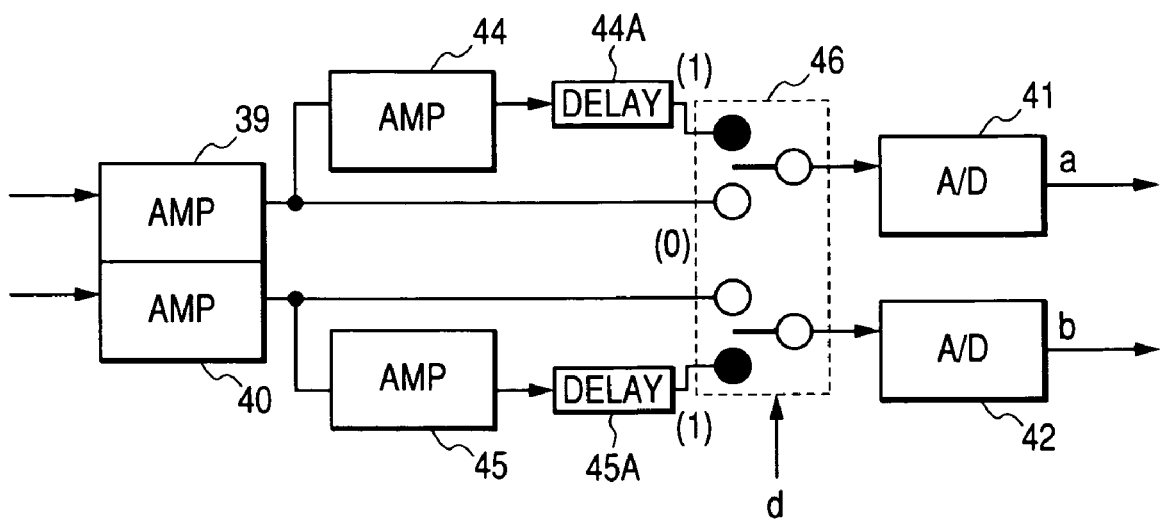
FIG. 11 is a block diagram of a portion of a video camera according to a fifth embodiment of this invention.

FIG. 11 shows a portion of a video camera according to the fifth embodiment of this invention. The video camera of FIG. 11 includes delay circuits 44A and 45A. The delay circuit 44A is provided between the amplifier 44 and the switch 46. The delay circuit 45A is provided between the amplifier 45 and the switch 46.

The delay circuit 44A defers the second amplified yaw-direction sensor signal by a 1-sample period (half the period of the control signal "d") before the signal reaches the switch 46. Accordingly, for every 1-period of the control signal "d", two successive signal samples in the digital yaw-direction sensor signal "a" originate from same-moment segments of the first and second amplified yaw-direction sensor signals. The two successive signal samples are referred to as the counterpart signal samples or the synchronized signal samples.

The delay circuit 45A defers the second amplified pitch-direction sensor signal by a 1-sample period (half the period of the control signal "d") before the signal reaches the switch 46. Accordingly, for every 1-period of the control signal "d", two successive signal samples in the digital pitch-direction sensor signal "b" originate from same-moment segments of the first and second amplified pitch-direction sensor signals.

The processing of the digital yaw-direction sensor signal "a" and the processing of the digital pitch-direction sensor signal "b" are similar to each other. Therefore, only the processing of the digital yaw-direction sensor signal "a" will be mentioned below.

The controller 43 or the microcomputer 43A accesses alternate ones of signal samples in the digital yaw-direction sensor signal "a" which originate from the second amplified sensor signal. The controller 43 or the microcomputer 43A compares the value represented by every accessed digital signal sample with the dynamic-range limit TH to decide whether or not the A/D converter 41 is saturated. When the value represented by the accessed digital signal sample is equal to the dynamic-range limit TH, that is, when the A/D converter 41 is saturated, the controller 43 or the microcomputer 43A discards the accessed digital signal sample and generates a corresponding time segment (a corresponding sample) of the processing-resultant digital sensor signal from the other counterpart signal sample or the other synchronized signal sample in the digital yaw-direction sensor signal "a", and which originates from the first amplified sensor signal. Specifically, the value represented by the other counterpart signal sample is doubled, and the resultant signal sample is used as a corresponding time segment (a corresponding sample) of the processing-resultant digital sensor signal.

Sixth Embodiment

A sixth embodiment of this invention is similar to the third embodiment thereof except for design changes mentioned hereafter.

Figure 12:
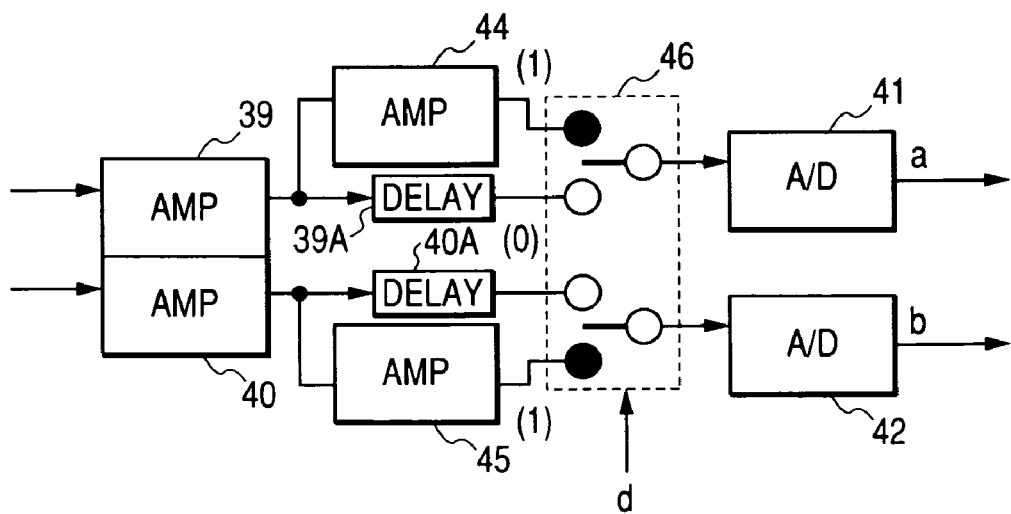
FIG. 12 is a block diagram of a portion of a video camera according to a sixth embodiment of this invention.

FIG. 12 shows a portion of a video camera according to the sixth embodiment of this invention. The video camera of FIG. 12 includes delay circuits 39A and 40A. The delay circuit 39A is provided between the amplifier 39 and the switch 46. The delay circuit 40A is provided between the amplifier 40 and the switch 46.

The delay circuit 39A defers the first amplified yaw-direction sensor signal by a 1-sample period (half the period of the control signal "d") before the signal reaches the switch 46. Accordingly, for every 1-period of the control signal "d", two successive signal samples in the digital yaw-direction sensor signal "a" originate from same-moment segments of the first and second amplified yaw-direction sensor signals. The two successive signal samples are referred to as the counterpart signal samples or the synchronized signal samples.

The delay circuit 40A defers the first amplified pitch-direction sensor signal by a 1-sample period (half the period of the control signal "d") before the signal reaches the switch 46. Accordingly, for every 1-period of the control signal "d", two successive signal samples in the digital pitch-direction sensor signal "b" originate from same-moment segments of the first and second amplified pitch-direction sensor signals.

The processing of the digital yaw-direction sensor signal "a" and the processing of the digital pitch-direction sensor signal "b" are similar to each other. Therefore, only the processing of the digital yaw-direction sensor signal "a" will be mentioned below.

The controller 43 or the microcomputer 43A accesses alternate ones of signal samples in the digital yaw-direction sensor signal "a" which originate from the second amplified sensor signal. The controller 43 or the microcomputer 43A compares the value represented by every accessed digital signal sample with the dynamic-range limit TH to decide whether or not the A/D converter 41 is saturated. When the value represented by the accessed digital signal sample is equal to the dynamic-range limit TH, that is, when the A/D converter 41 is saturated, the controller 43 or the microcomputer 43A discards the accessed digital signal sample and generates a corresponding time segment (a corresponding sample) of the processing-resultant digital sensor signal from the other counterpart signal sample or the other synchronized signal sample in the digital yaw-direction sensor signal "a", and which originates from the first amplified sensor signal. Specifically, the value represented by the other counterpart signal sample is doubled, and the resultant signal sample is used as a corresponding time segment (a corresponding sample) of the processing-resultant digital sensor signal.

Seventh Embodiment

A seventh embodiment of this invention is similar to one of the first to fourth embodiments thereof except for design changes mentioned hereafter.

Figure 13:
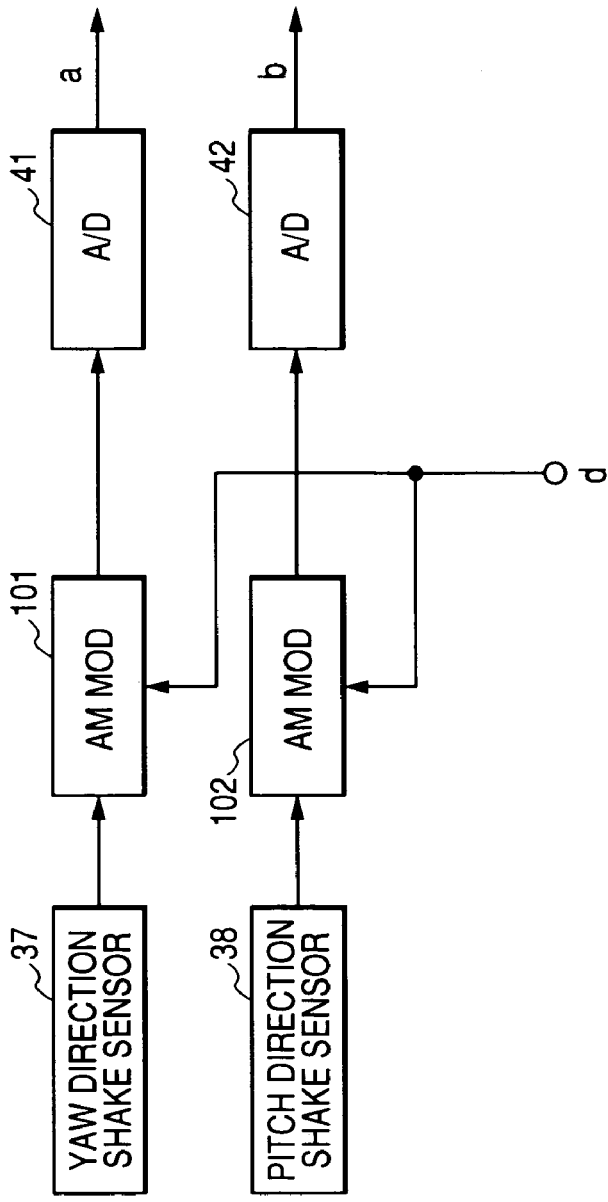
FIG. 13 is a block diagram of a portion of a video camera according to a seventh embodiment of this invention.

FIG. 13 shows a portion of a video camera according to the seventh embodiment of this invention. The video camera of FIG. 13 includes AM modulators 101 and 102. The AM modulator 101 is provided between the yaw-direction shake sensor 37 and the A/D converter 41. The AM modulator 102 is provided between the pitch-direction shake sensor 38 and the A/D converter 42.

The AM modulator 101 subjects the output signal of the yaw-direction shake sensor 37 to amplitude modulation responsive to the control signal "d". The AM modulator 101 outputs the modulation-resultant signal to the A/D converter 41. Specifically, the AM modulator 101 amplifies the output signal of the yaw-direction shake sensor 37 at a first predetermined gain when the control signal "d" is in a logic state of "0". The AM modulator 101 amplifies the output signal of the yaw-direction shake sensor 37 at a second predetermined gain higher than the first predetermined gain when the control signal "d" is in a logic state of "1". The AM modulator 101 outputs the amplification-resultant signal (the modulation-resultant signal) to the A/D converter 41. The signal outputted from the AM modulator 101 to the A/D converter 41 is equivalent to the signal outputted from the switch 46 to the A/D converter 41 in one of the first to fourth embodiments of this invention.

The AM modulator 102 subjects the output signal of the pitch-direction shake sensor 38 to amplitude modulation responsive to the control signal "d". The AM modulator 102 outputs the modulation-resultant signal to the A/D converter 42. Specifically, the AM modulator 102 amplifies the output signal of the pitch-direction shake sensor 38 at the first predetermined gain when the control signal "d" is in a logic state of "0". The AM modulator 102 amplifies the output signal of the pitch-direction shake sensor 38 at the second predetermined gain when the control signal "d" is in a logic state of "1". The AM modulator 102 outputs the amplification-resultant signal (the modulation-resultant signal) to the A/D converter 42. The signal outputted from the AM modulator 102 to the A/D converter 42 is equivalent to the signal outputted from the switch 46 to the A/D converter 42 in one of the first to fourth embodiments of this invention.

Eighth Embodiment

An eighth embodiment of this invention is similar to the second embodiment thereof except for design changes mentioned hereafter.

The yaw-direction sensor signal and the pitch-direction sensor signal outputted from the sensors 37 and 38 are processed in similar ways. Therefore, only the processing of the yaw-direction sensor signal will be described below.

Figure 14:
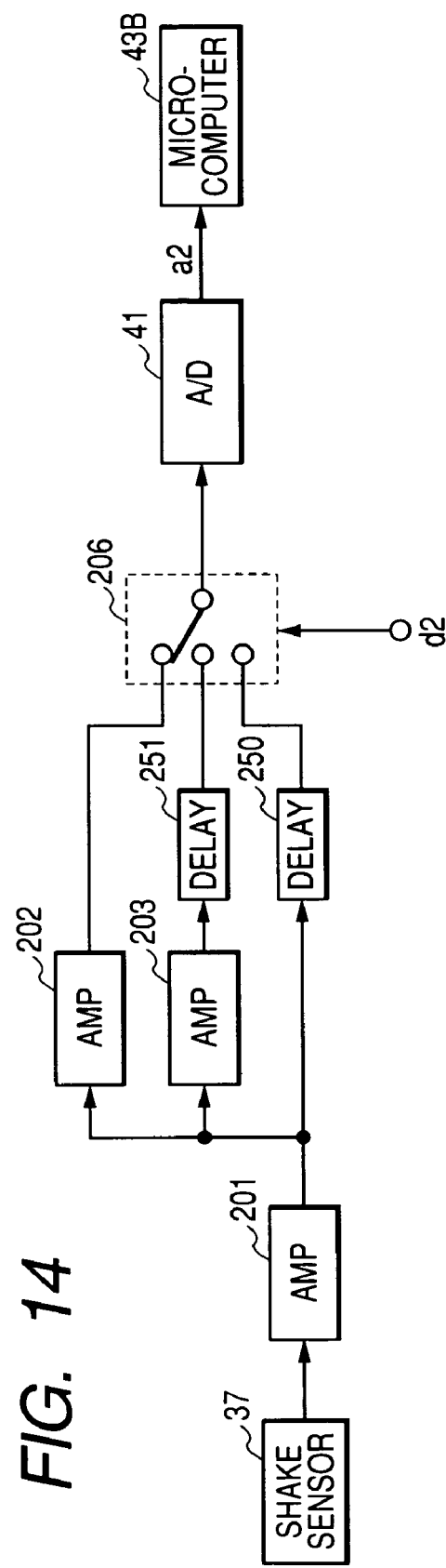
FIG. 14 is a block diagram of a portion of a video camera according to an eighth embodiment of this invention.

FIG. 14 shows a portion of a video camera according to the eighth embodiment of this invention. The video camera of FIG. 14 includes amplifiers 201, 202, and 203, a switch 206, delay circuits 250 and 251, and a microcomputer 43B.

The yaw-direction shake sensor 37 feeds the yaw-direction sensor signal to the amplifier 201. The amplifier 201 enlarges the yaw-direction sensor signal. The amplifier 201 outputs the enlargement-resultant yaw-direction sensor signal to the delay circuit 250 and the amplifiers 202 and 203. The output signal from the amplifier 201 is referred as the first amplified yaw-direction sensor signal. The delay circuit 250 defers the first amplified yaw-direction sensor signal by a 2-sample period (two thirds of the period of a control signal "d2") before the signal reaches the switch 206.

The amplifier 203 enlarges the first amplified yaw-direction sensor signal at a gain of 2 to generate a second amplified yaw-direction sensor signal. The amplifier 203 outputs the second amplified yaw-direction sensor signal to the delay circuit 251. The delay circuit 251 defers the second amplified yaw-direction sensor signal by a 1-sample period (one third of the period of the control signal "d2") before the signal reaches the switch 206.

The amplifier 202 enlarges the first amplified yaw-direction sensor signal at a gain of 4 to generate a third amplified yaw-direction sensor signal. The amplifier 202 outputs the third amplified yaw-direction sensor signal to the switch 206.

The switch 206 selects one among the first, second, and third amplified yaw-direction sensor signals in response to the control signal "d2", and passes the selected yaw-direction sensor signal to the A/D converter 41. The control signal "d2" has two bits, and periodically and cyclically changes among first, second, and third states. The switch 206 selects the first amplified yaw-direction sensor signal when the control signal "d2" is in its first state. The switch 206 selects the second amplified yaw-direction sensor signal when the control signal "d2" is in its second state. The switch 206 selects the third amplified yaw-direction sensor signal when the control signal "d2" is in its third state. Therefore, the switch 206 multiplexes the first, second, and third amplified yaw-direction sensor signals on a time sharing basis. The switch 206 outputs the multiplexing-resultant yaw-direction sensor signal to the A/D converter 41.

The A/D converter 41 changes the multiplexing-resultant yaw-direction sensor signal into a corresponding digital yaw-direction sensor signal "a2" through analog-to-digital conversion including quantization. The digital yaw-direction sensor signal "a2" has a sequence of time segments, that is, digital signal samples each having a predetermined number of bits. In other words, the A/D converter 41 changes the multiplexing-resultant yaw-direction sensor signal into a sequence of digital signal samples constituting a digital yaw-direction sensor signal "a2". The A/D converter 41 outputs the digital yaw-direction sensor signal "a2" to the microcomputer 43B.

The delay circuits 250 and 251 cause the following timing relation among signal samples in the digital yaw-direction sensor signal "a2". For every 1-period of the control signal "d2", three successive signal samples in the digital yaw-direction sensor signal "a2" originate from same-moment segments of the first, second, and third amplified yaw-direction sensor signals. The three successive signal samples are referred to as the synchronized signal samples.

The microcomputer 43B replaces the microcomputer 43A in FIG. 5. The microcomputer 43B processes the digital yaw-direction sensor signal "a2" to get a processing-resultant digital sensor signal representing, for example, a waveform A4 shown in FIG. 15. The microcomputer 43B is programmed to implement operation steps indicated below.

The microcomputer 43B accesses ones among signal samples in the digital yaw-direction sensor signal "a" which originate from the second and third amplified sensor signals. The microcomputer controller 43 or the microcomputer 43A compares the value represented by every accessed digital signal sample with the dynamic-range limit TH to decide whether or not the A/D converter 41 is saturated. When the value represented by the accessed digital signal sample originating from the third amplified sensor signal is smaller than the dynamic-range limit TH, that is, when the A/D converter 41 is not saturated, the microcomputer 43B uses the accessed digital signal sample as a corresponding time segment (a corresponding sample) of the processing-resultant digital sensor signal. When the value represented by the accessed digital signal sample originating from the third amplified sensor signal is equal to the dynamic-range limit TH and the value represented by the synchronized accessed digital signal sample originating from the second amplified sensor signal is smaller than the dynamic-range limit TH, that is, when the A/D converter 41 is saturated regarding only the third amplified sensor signal, the microcomputer 43B discards the accessed digital signal sample originating from the third amplified sensor signal and generates a corresponding time segment (a corresponding sample) of the processing-resultant digital sensor signal from the synchronized accessed digital signal sample originating from the second amplified sensor signal. Specifically, the value represented by the synchronized accessed signal sample is doubled, and the resultant signal sample is used as a corresponding time segment (a corresponding sample) of the processing-resultant digital sensor signal. When both the values represented by the synchronized accessed digital signal samples originating from the second and third amplified sensor signals are equal to the dynamic-range limit TH, that is, when the A/D converter 41 is saturated regarding both the second and third amplified sensor signals, the microcomputer 43B discards the synchronized accessed digital signal samples originating from the second and third amplified sensor signals and generates a corresponding time segment (a corresponding sample) of the processing-resultant digital sensor signal from the other synchronized digital signal sample originating from the first amplified sensor signal. Specifically, the value represented by the other synchronized signal sample is quadrupled, and the resultant signal sample is used as a corresponding time segment (a corresponding sample) of the processing-resultant digital sensor signal.

Figure 15:
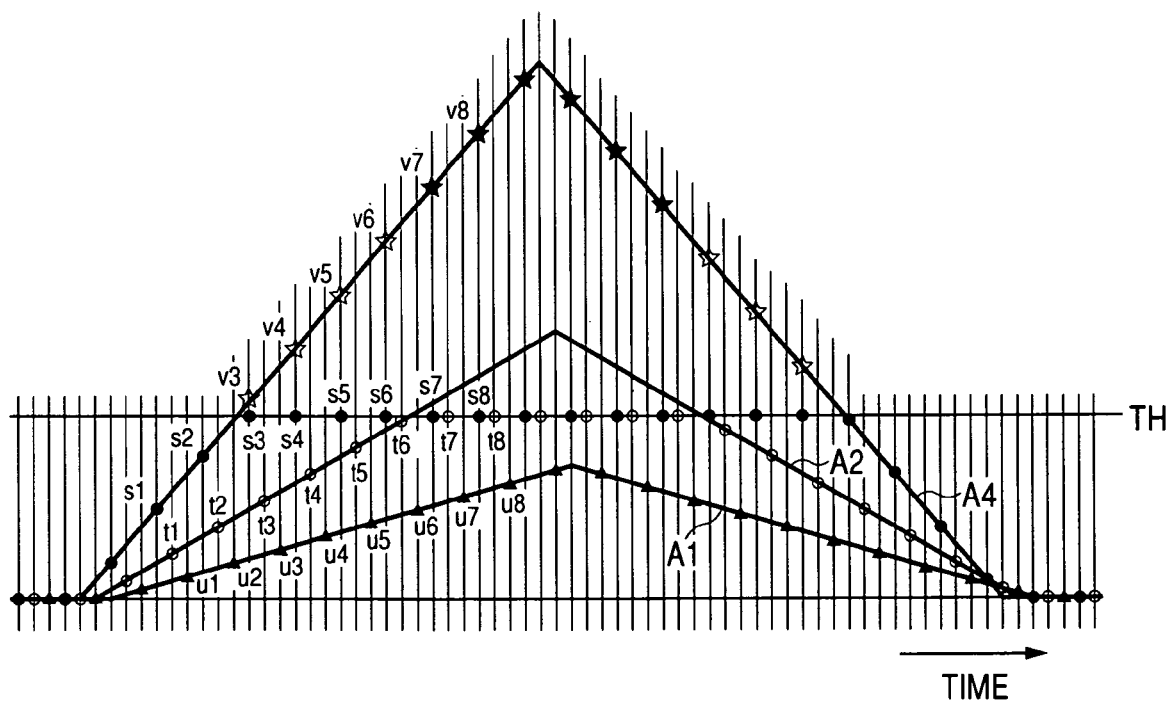
FIG. 15 is a time-domain diagram of the values and waveforms represented by digital signals in the video camera of the eighth embodiment of this invention.

The A/D converter 41 generates and outputs a sequence of digital signal samples representing values s1, t1, u1, s2, t2, u2, . . . such as shown in FIG. 15. The line A4 connecting the points of the values s1, s2, . . . corresponds to the waveform of the third amplified sensor signal. The line A2 connecting the points of the values t1, t2, . . . corresponds to the waveform of the second amplified sensor signal. The line A1 connecting the points of the values u1, u2, . . . corresponds to the waveform of the first amplified sensor signal. In FIG. 8, the sample values s3, s4, s5, s6, s7, s8, t7, and t8 are equal to the dynamic-range limit TH and are inaccurate since they are generated when the A/D converter 41 is saturated. The sequence of digital signal samples outputted from the A/D converter 41 is the digital yaw-direction sensor signal "a2".

With reference to FIG. 8, the sample value s1 (or s2) originating from the third amplified sensor signal is smaller than the dynamic-range limit TH. Therefore, the digital signal sample representing the value s1 (or s2) is used as a corresponding time segment (a corresponding sample) of the processing-resultant digital sensor signal. The sample value s3 (or one of s4, s5, and s6) originating from the third amplified sensor signal is equal to the dynamic-range limit TH, and the synchronized-sample value t3 (or one of t4, t5, and t6) is smaller than the dynamic-range limit TH. Therefore, the digital signal sample representing the value s3 and originating from the third amplified sensor signal is discarded. The synchronized-sample value t3 originating from the second amplified sensor signal is doubled, and the resultant signal sample representing the value v3 (=2·t3) is used as a corresponding time segment (a corresponding sample) of the processing-resultant digital sensor signal. Both the sample values s7 and t7 (or s8 and t8) are equal to the dynamic-range limit TH. Therefore, the digital signal samples representing the values s7 and t7 and originating from the second and third amplified sensor signals are discarded. The other synchronized-sample value u7 originating from the first amplified sensor signal is quadrupled, and the resultant signal sample representing the value v7 (=4·u7) is used as a corresponding time segment (a corresponding sample) of the processing-resultant digital sensor signal.

Accordingly, a small yaw-direction shake detected by the sensor 37 is converted into a digital signal having a high resolution. An intermediate yaw-direction shake detected by the sensor 37 is converted into a digital signal having an intermediate resolution. A great yaw-direction shake detected by the sensor 37 is converted into a digital signal having a low resolution. This design causes a wide dynamic range of the system for processing the output signal of the sensor 37 into the processing-resultant digital sensor signal.

As understood from the above description, the eighth embodiment of this invention implements a change among 3 different gains with respect to each of the yaw-direction sensor signal and the pitch-direction sensor signal. The eighth embodiment of this invention may be modified to implement a change among 4 or more different gains with respect to each of the yaw-direction sensor signal and the pitch-direction sensor signal.

Ninth Embodiment

A ninth embodiment of this invention is similar to the sixth embodiment thereof except for design changes mentioned hereafter.

Figure 16:
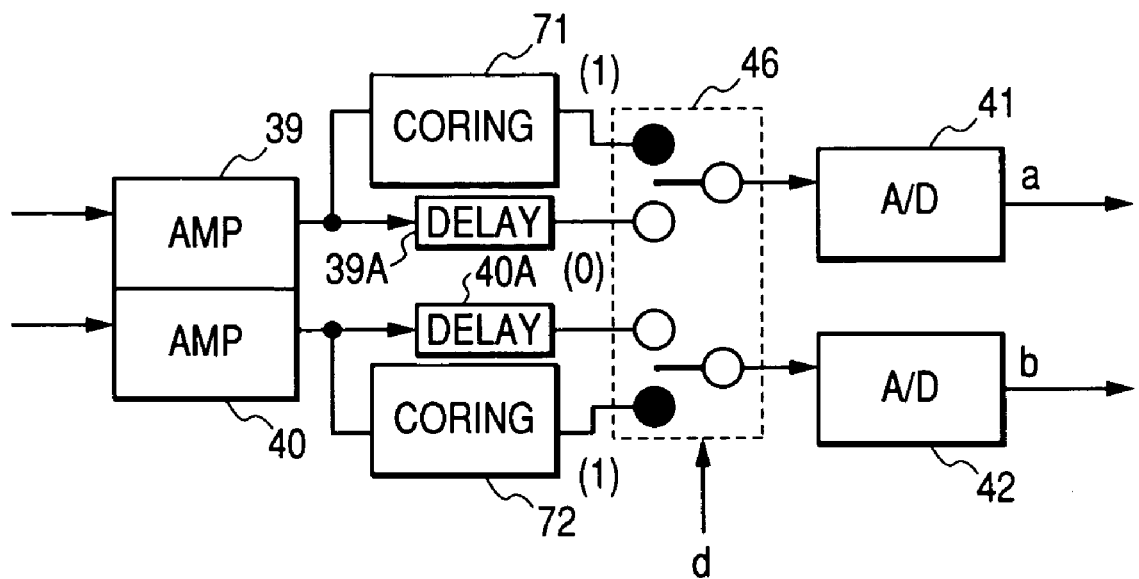
FIG. 16 is a block diagram of a portion of a video camera according to a ninth embodiment of this invention.

FIG. 16 shows a portion of a video camera according to the ninth embodiment of this invention. The video camera of FIG. 16 includes nonlinear circuits 71 and 72 which replace the amplifiers 44 and 45 (see FIG. 12) respectively. Each of the nonlinear circuits 71 and 72 uses, for example, a coring circuit.

Figure 17:
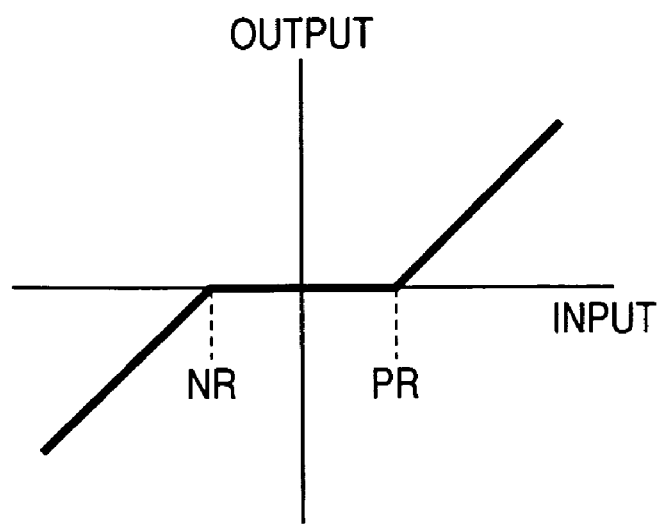
FIG. 17 is a diagram of the input/output characteristic of a coring circuit in FIG. 16.

The coring circuits 71 and 72 are similar to each other. Therefore, only the coring circuit 71 will be described below. Basically, the coring circuit 71 serves as an attenuator. Specifically, the coring circuit 71 has an input/output characteristic shown in FIG. 17. The level of the output signal from the coring circuit 71 remains equal to 0 as the level of the input signal to the coring circuit 71 varies in the dead zone between a negative reference NR and a positive reference PR having a same absolute value. The level of the output signal increases at a slope of 1 as the level of the input signal rises from the positive reference PR. The level of the output signal decreases at a slope of −1 as the level of the input signal drops from the negative reference NR. Preferably, the size of the dead zone is chosen to correspond to the dynamic-range limit TH.

The coring circuit 71 receives the amplified sensor signal from the amplifier 39. The coring circuit 71 subjects the amplified sensor signal to a coring process to get a coring-resultant sensor signal. The coring circuit 71 outputs the coring-resultant sensor signal to the switch 46. The amplified sensor signal is transmitted from the amplifier 39 to the switch 46 via the delay circuit 39A. The delay circuit 39A may be omitted. The switch 46 multiplexes the amplified sensor signal and the coring-resultant sensor signal in response to the control signal "d" on a time sharing basis. The switch 46 outputs the multiplexing-resultant signal to the A/D converter 41.

Figure 18:
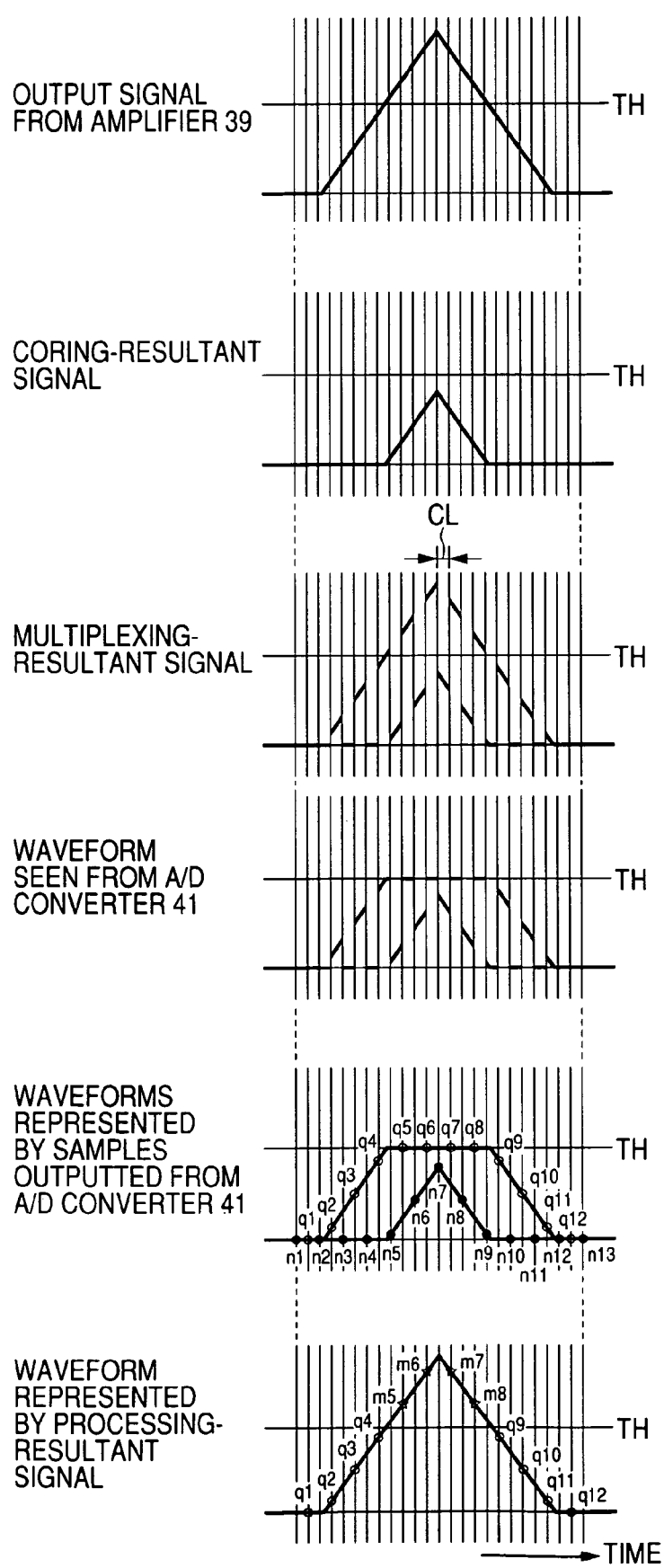
FIG. 18 is a time-domain diagram of various signals in the video camera of the ninth embodiment of this invention.

When the amplified sensor signal outputted from the amplifier 39 has a waveform shown in FIG. 18, the coring-resultant sensor signal outputted from the coring circuit 71 has a waveform shown in FIG. 18. As previously mentioned, the switch 46 multiplexes the amplified sensor signal and the coring-resultant sensor signal on a time sharing basis. The multiplexing-resultant sensor signal has a waveform shown in FIG. 18. During first alternate ones of clock periods CL, the multiplexing-resultant sensor signal is formed by the amplified sensor signal. During second alternate ones of clock periods CL, the multiplexing-resultant sensor signal is formed by the coring-resultant sensor signal.

The A/D converter 41 receives the multiplexing-resultant sensor signal from the switch 46. The A/D converter 41 has a certain limit TH of its dynamic range. Therefore, the A/D converter 41 regards the multiplexing-resultant signal as a signal having a waveform shown in FIG. 18 (the waveform seen from the A/D converter 41). When the level of the multiplexing-resultant sensor signal exceeds the dynamic-range limit TH, the A/D converter 41 is saturated so that the A/D converter 41 regards the level as being equal to the dynamic-range limit TH. An example of detailed operation of the A/D converter 41 is as follows. For every clock period, the A/D converter 41 samples the waveform seen from the A/D converter 41 to get an analog signal sample, and converts the analog signal sample into a corresponding digital signal sample. Thus, the A/D converter 41 generates and outputs a sequence of digital signal samples representing values n1, q1, n2, q2, . . . , n12, and q12 shown in FIG. 18. The line connecting the points of the values n1, n2, . . . , and n12 corresponds to the waveform of the coring-resultant sensor signal while the line connecting the points of the values q1, q2, . . . , and q12 corresponds to the waveform of the amplified sensor signal. In FIG. 18, the sample values q5, q6, q7, and q8 are equal to the dynamic-range limit TH and are inaccurate since they are generated when the A/D converter 41 is saturated. The sequence of digital signal samples outputted from the A/D converter 41 is the digital yaw-direction sensor signal "a". The digital yaw-direction sensor signal "a" is fed to the controller 43 or the microcomputer 43A.

In the ninth embodiment of this invention, the controller 43 or the microcomputer 43A processes the digital yaw-direction sensor signal "a" to get a processing-resultant digital sensor signal representing a waveform shown in FIG. 18. Specifically, the controller 43 or the microcomputer 43A accesses alternate ones of signal samples in the digital yaw-direction sensor signal "a" which originate from the amplified sensor signal. The controller 43 or the microcomputer 43A compares the value represented by every accessed digital signal sample with the dynamic-range limit TH to decide whether or not the A/D converter 41 is saturated. When the value represented by the accessed digital signal sample is smaller than the dynamic-range limit TH, that is, when the A/D converter 41 is not saturated, the controller 43 or the microcomputer 43A uses the accessed digital signal sample as a corresponding time segment (a corresponding sample) of the processing-resultant digital sensor signal. When the value represented by the accessed digital signal sample is equal to the dynamic-range limit TH, that is, when the A/D converter 41 is saturated, the controller 43 or the microcomputer 43A discards the accessed digital signal sample and generates a corresponding time segment (a corresponding sample) of the processing-resultant digital sensor signal from two signal samples in the digital yaw-direction sensor signal "a" which immediately precedes and follows the accessed digital signal sample respectively, and which originate from the coring-resultant sensor signal. Specifically, the values represented by the immediately-preceding and immediately-following signal samples are averaged, and a new digital signal sample is assigned a value equal to the averaging result plus the dynamic-range limit TH. Then, the new digital signal sample is used as a corresponding time segment (a corresponding sample) of the processing-resultant digital sensor signal.

With reference to FIG. 18, the digital signal sample representing the value q4 is directly used as a corresponding time segment (a corresponding sample) of the processing-resultant digital sensor signal. The digital signal sample representing the value q5 is discarded, and the values n5 and n6 represented by the immediately-preceding and immediately-following digital signal samples are averaged. Then, a new digital signal sample is assigned a value m5 equal to the averaging result plus the dynamic-range limit TH, and the new digital signal sample is used as a corresponding time segment (a corresponding sample) of the processing-resultant digital sensor signal. The value m5 represented by the new digital signal sample is given as follows.

$$m5 = TH + \{(n5 + n6)/2\}$$

Figure 19:
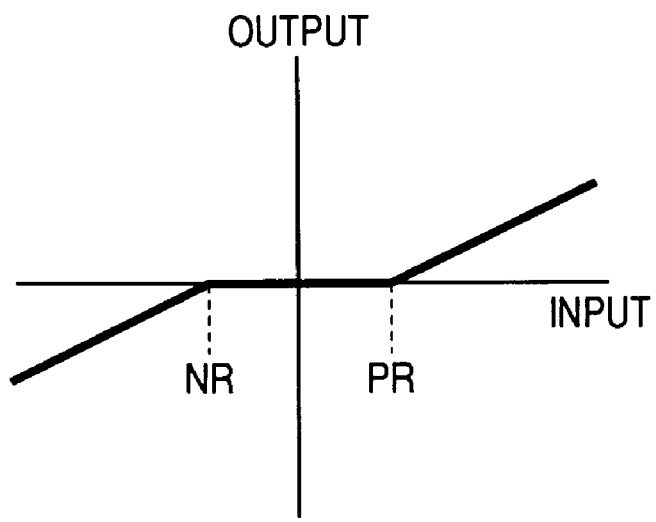
FIG. 19 is a diagram of the input/output characteristic of a modified coring circuit.

The coring circuit 71 may be modified to have an input/output characteristic shown in FIG. 19. In this case, the level of the output signal from the coring circuit 71 remains equal to 0 as the level of the input signal to the coring circuit 71 varies in the dead zone between the negative reference NR and the positive reference PR having a same absolute value. The level of the output signal increases at a slope less than 1 as the level of the input signal rises from the positive reference PR. The level of the output signal decreases at a slope greater than −1 as the level of the input signal drops from the negative reference NR.

Tenth Embodiment

A tenth embodiment of this invention is similar to the first or second embodiment thereof except for design changes mentioned hereafter.

Figure 20:
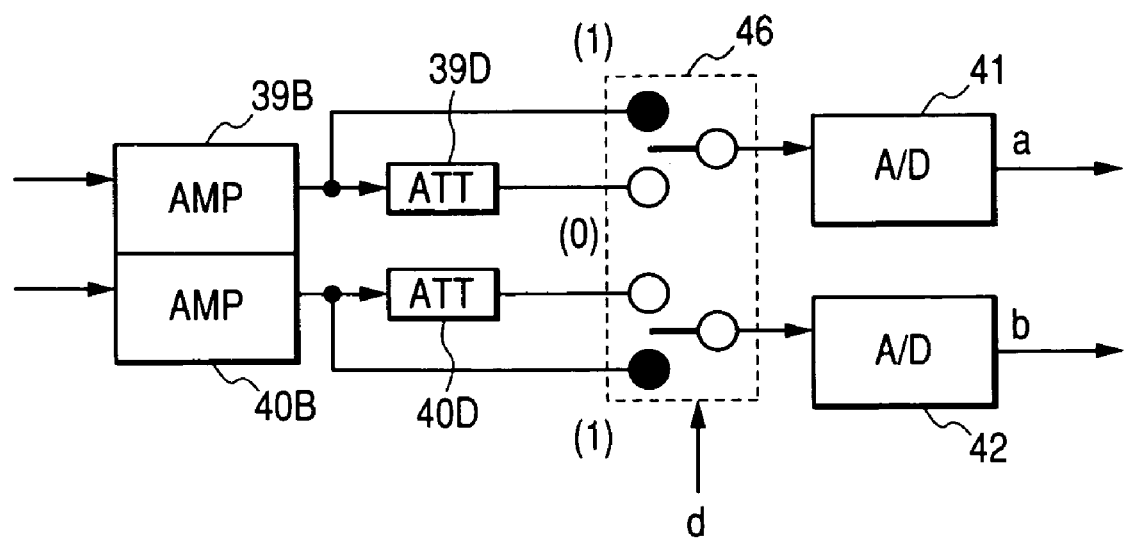
FIG. 20 is a block diagram of a portion of a video camera according to a tenth embodiment of this invention.

FIG. 20 shows a portion of a video camera according to the tenth embodiment of this invention. The video camera of FIG. 20 includes amplifiers 39B and 40B, and attenuators 39D and 40D. The amplifiers 39B and 40B replace the amplifiers 39 and 40 in the first or second embodiment of this invention (see FIG. 1), respectively. The amplifiers 44 and 45 (see FIG. 1) are omitted from the video camera of FIG. 20. The gain of the amplifiers 39B and 40B are chosen so that the output signals thereof will be equivalent to the output signals from the amplifiers 44 and 45 respectively. The output signals of the amplifiers 39B and 40B are applied to the switch 46 instead of the output signals from the amplifiers 44 and 45. The attenuator 39D is provided between the amplifier 39B and the switch 46. The attenuator 39D subjects the output signal of the amplifier 39B to linear operation with a fixed gain less than 1. Specifically, the attenuator 39D damps the output signal of the amplifier 39B to generate an attenuation-resultant signal. The attenuator 39D outputs the attenuation-resultant signal to the switch 46. The attenuation-resultant signal is used by the switch 46 instead of the output signal from the amplifier 39 (see FIG. 1). The attenuator 40D is provided between the amplifier 40B and the switch 46. The attenuator 40D subjects the output signal of the amplifier 40B to linear operation with a fixed gain less than 1. Specifically, the attenuator 40D damps the output signal of the amplifier 40B to generate an attenuation-resultant signal. The attenuator 40D outputs the attenuation-resultant signal to the switch 46. The attenuation-resultant signal is used by the switch 46 instead of the output signal from the amplifier 40 (see FIG. 1).

The factor of the damping by the attenuators 39D and 40D is chosen so that the attenuation-resultant signals will be equivalent to the output signals from the amplifiers 39 and 40 (see FIG. 1) respectively.

The switch 46 multiplexes the output signal from the amplifier 39B and the output signal from the attenuator 39D, and outputs the multiplexing-resultant signal to the A/D converter 41. The switch 46 multiplexes the output signal from the amplifier 40B and the output signal from the attenuator 40D, and outputs the multiplexing-resultant signal to the A/D converter 42.

Advantages Provided by the Invention

It is possible to provide a video camera equipped with an anti-shake system having a wide dynamic range and a relatively small circuit scale.

A small shake detected by a shake sensor is converted into a digital sensor signal having a high resolution or a large number of effective bits per sample. Therefore, even a small shake can be accurately compensated for.

What is claimed is:

1. A video camera comprising:
an image sensor for converting incident light into an electric signal;
first means for converting the electric signal generated by the image sensor into a digital video signal;
a memory having a first storage area for storing segments of the digital video signal generated by the first means on a frame-by-frame basis;
second means for detecting a shake of a camera body, and generating an analog detection signal representative of the detected shake;
an amplifier for amplifying the analog detection signal generated by the second means to generate an analog amplification-resultant signal;
third means for converting the analog detection signal generated by the second means and the analog amplification-resultant signal generated by the amplifier into a digital detection signal and a first digital amplification-resultant signal respectively;
fourth means for amplifying a signal value represented by the digital detection signal generated by the third means on a digital basis to generate a second digital amplification-resultant signal;
fifth means for deciding whether or not values represented by at least two successive samples of the first digital amplification-resultant signal are greater than a predetermined reference value;
sixth means for selecting the second digital amplification-resultant signal when the fifth means decides that the values represented by the at least two successive samples of the first digital amplification-resultant signal are greater than the predetermined reference value, and selecting the first digital amplification-resultant signal when the fifth means decides that the values represented by the at least two successive samples of the first digital amplification-resultant signal are not greater than the predetermined reference value;
seventh means for generating a shake corrective signal in response to the signal selected by the sixth means;
eighth means for reading out segments of the digital video signal from a second storage area movable within the first storage area of the memory to generate a correction-resultant video signal; and
ninth means for moving the second storage area relative to the first storage area in response to the shake corrective signal generated by the seventh means.

2. A video camera comprising:
first means for detecting a shake of a camera body, and generating a first analog signal representative of the detected shake;
second means for subjecting the first analog signal generated by the first means to linear operation with first and second gains to generate second and third analog signals respectively, the second gain being higher than the first gain;
an A/D converter;
third means for feeding the second analog signal and the third analog signal alternately to the A/D converter to convert the second analog signal and the third analog signal into a first digital signal and a second digital signal respectively;
fourth means for deciding whether or not the A/D converter is saturated by the third analog signal;
fifth means for selecting the first digital signal and discarding the second digital signal when the fourth means decides that the A/D converter is saturated, and selecting the second digital signal and discarding the first digital signal when the fourth means decides that the A/D converter is not saturated; and
sixth means for generating a shake corrective signal in response to the signal selected by the fifth means.

3. A video camera as recited in claim 2, wherein the second means comprises an amplifier for amplifying the first analog signal into the third analog signal, and means for directly using the first analog signal as the second analog signal.

4. A video camera as recited in claim 2, wherein the second means includes an amplitude modulator for subjecting the first analog signal to amplitude modulation to generate the second and third analog signals.

5. A video camera as recited in claim 2, wherein the second means comprises an attenuator for attenuating the first analog signal into the second analog signal, and means for directly using the first analog signal as the third analog signal.

* * * * *